(12) United States Patent
Yamada et al.

(10) Patent No.: US 6,504,566 B1
(45) Date of Patent: Jan. 7, 2003

(54) OPTICAL PRINTING APPARATUS

(75) Inventors: Keiki Yamada, Tokyo (JP); Ichiro Furuki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/522,070

(22) Filed: Mar. 9, 2000

(30) Foreign Application Priority Data

Apr. 28, 1999 (JP) .......................................... 11-121533

(51) Int. Cl.7 .............................. B41J 2/47; B41J 2/435
(52) U.S. Cl. ...................... 347/240; 347/237; 347/247; 347/251
(58) Field of Search ................................ 347/237, 238, 347/240, 247, 251; 250/205; 349/2, 106, 186; 359/259, 276; 358/302

(56) References Cited

U.S. PATENT DOCUMENTS

| | | | |
|---|---|---|---|
| 4,651,176 A | 3/1987 | Yamakawa et al. | 347/130 |
| 4,939,529 A * | 7/1990 | Kanayama et al. | 347/237 |
| 5,011,271 A * | 4/1991 | Saito et al. | 359/259 |
| 5,162,919 A * | 11/1992 | Ono | 358/302 |
| 5,166,510 A * | 11/1992 | Matsubara et al. | 250/205 |
| 5,247,387 A * | 9/1993 | Matsubara et al. | 359/276 |
| 5,548,423 A * | 8/1996 | Natsunaga | 349/106 |
| 5,812,176 A * | 9/1998 | Kawabe et al. | 347/240 |
| 6,195,114 B1 * | 2/2001 | Fujita | 347/237 |

FOREIGN PATENT DOCUMENTS

| | | |
|---|---|---|
| JP | A62134629 | 6/1987 |
| JP | A7256928 | 10/1995 |

* cited by examiner

Primary Examiner—Hai Pham
(74) Attorney, Agent, or Firm—Birch, Stewart, Kolasch & Birch, LLP

(57) ABSTRACT

In an optical printing apparatus, an image having a high image quality is desirably produced under stable condition, even when variations occur and exposure conditions are different from each other, which are caused by differences in response speeds of a light source and a liquid crystal shutter element, and also by differences in element driving conditions. The optical printing apparatus is arranged by including: image data input for inputting image data; reference level generator producing a reference level; comparator for comparing multi-value data outputted from the image data input with the reference level so as to convert the multi-value data into binary data; data transferring element for transferring the binary data outputted from the comparator as head data to the print head; latch controller for latching data of the print data; and strobe controller capable of causing the print head to expose the light therefrom. Then, the liquid crystal shutter element corresponding to a non-recording pixel is also ON/OFF-driven. Accordingly, deterioration in the image quality and color shifts, which are caused by a difference in driving intervals, can be solved.

18 Claims, 15 Drawing Sheets

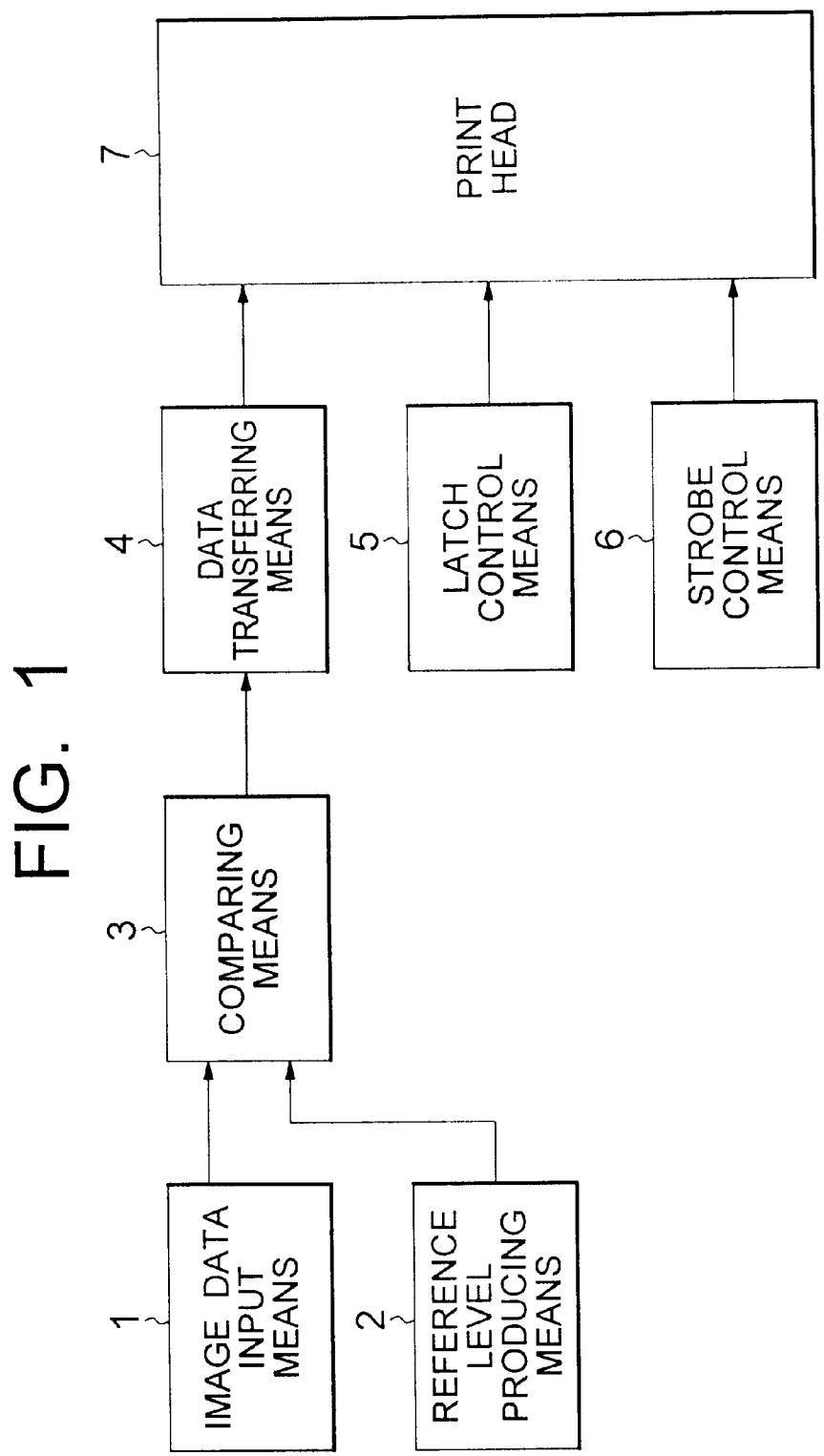

| TEMPERATURE | TIME REQUIRED TO STABILIZE LIGHT SOURCE (RELATIVE VALUE) |
|---|---|
| ~ 5°C | 1.2 |
| 5°C~10°C | 1.1 |
| ⎰ | ⎰ |
| 60°C~ | 0.5 |

OPTICAL PRINTING APPARATUS

BACKGROUND OF THE INVENTION

1. Field of the Invention

The present invention generally relates to an optical printing apparatus for exposing light onto a photosensitive recording medium to form a gradation image. More specifically, the present invention is directed to such an optical printing apparatus. That is, while one column, or plurality of columns constituted by switching elements (e.g., liquid crystal shutter elements) are arranged as a print head, the respective elements are independently controlled in response to image data so as to print out a gradation image in the optical printing apparatus.

2. Description of the Related Art

Various sorts of optical printing apparatuses have been developed as apparatuses employing instant films and simultaneous color paper, and are commercially available in the markets. In these optical printing apparatuses, light is exposed onto photosensitive recording media so as to form gradation images.

A conventional optical printing apparatus will now be explained with reference to a drawing. FIG. 19 is a perspective view for schematically indicating a structure of a conventional optical printing apparatus as disclosed in, for instance, Japanese Patent Application Laid-open No. 7-256928.

In FIG. 19, white light emitted from a halogen point light source 100 is separated into red-colored light, green-colored light, and blue-colored light by way of a color liquid crystal (LCD) shutter 101. The R, G, B-colored light is continuously irradiated onto an edge surface of an acrylic rod 9 in a time shift manner. In this print head, the acrylic rod 9 is covered with a reflection foil on which aluminum and the like are vapor-deposited except for a light emitting plane thereof. Thus, this acrylic rod 9 owns such a function capable of effectively converting light entered from a rod edge surface into line-shaped light. As a result, the red line-shaped light, the green line-shaped light, and the blue line-shaped light are continuously irradiated onto a black/white shutter array 10 in a time shift manner.

In this case, 3 columns of pixel arrays corresponding to the red light, the green light, and the blue light are provided inside the black/white shutter array 10. These pixel arrays are driven in such a manner that only designated color light can pass therethrough. For example, when the red line-shaped light is irradiated, this red line-shaped light can pass through only one pixel array corresponding to the color light, whereas the other two pixel arrays are kept under shield condition.

Then, the red line-shaped light, the green-shaped light, and the blue line-shaped light, which are modulated by the black/white shutter array 10 are focused on a photosensitive paper such as the spectra instant film manufactured by Polaroid Inc., by using a SELFOC lens array 12 (namely, tradename of converging lens array). At this time, since the photosensitive paper is relatively transported with respect to the black/white LCD shutter array 10, the red line-shaped light, the green line-shaped light, and the blue line-shaped light are sequentially exposed onto the same place on the photosensitive paper. As a result, a two-dimensional print image can be obtained.

In the above-described conventional optical printing apparatus, there is a problem in that the images having high image qualities cannot be formed under stable condition due to the variation and the exposure conditions, which are caused by differences in the response speeds of the light sources and/or the liquid crystal shutter elements (arrays), or differences in the drive conditions of these LCD shutter elements.

Concretely speaking, the transmittance of the LCD shutter element varies due to the basic characteristic thereof, i.e., the differences in the intervals of driving the LCD shutter elements. For instance, in an LCD shutter element corresponding to a recording pixel subsequent to a non-recording pixel, and also in LCD shutter elements corresponding to pixels where recording pixels are continued, the transmittance thereof is changed due to differences in histories thereof. Also, in the case that the LCD shutter array is constructed as a single column, and the red, green, and blue light sources are sequentially turned ON so as to construct the low-cost optical printing apparatus, color shift may occur because of the temporal shifts. Also, when these red, green, and blue light sources are sequentially switched, the light leakage phenomenon will occur. As a result, there is another problem that the correct image cannot be formed.

SUMMARY OF THE INVENTION

The present invention has been made to solve the above-explained problems, and therefore, has an object to provide an optical printing apparatus capable of recording an image having a high image quality, but without having any deterioration in quality and color shift. These deterioration of the image quality and color shift problems are caused by the difference in the intervals of driving LCD shutter elements.

To achieve the above-described object, an optical printing apparatus, according to a first aspect of the present invention, is featured by such an optical printing apparatus for selectively exposing light emitted from a print head onto a photosensitive recording medium to thereby form a gradation image, in which the print head contains a light source and a plurality of liquid crystal shutter elements, comprising: image data input means for inputting image data; reference level producing means for producing a reference level; comparing means for comparing multi-value data outputted from the image data input means with the reference level so as to convert the multi-value data into binary data; data transferring means for transferring the binary data outputted from the comparing means as head data to the print head; latch control means for latching data of the print data; and strobe control means capable of causing the print head to expose the light therefrom; whereby the print head is driven in response to the output results of the data transferring means, the latch control means, and the strobe control means to thereby form the gradation image, and also the liquid crystal shutter element corresponding to a non-recording pixel is ON/OFF-driven.

Also, an optical printing apparatus, according to a second aspect of the present invention, is featured by such an optical printing apparatus for selectively exposing light emitted from a print head onto a photosensitive recording medium to thereby form a gradation image, in which the print head contains a light source and a plurality of liquid crystal shutter elements, comprising: image data input means for inputting image data; reference level producing means for producing a reference level; comparing means for comparing multi-value data outputted from the image data input means with the reference level so as to convert the multi-value data into binary data; a selector for selecting any one of the binary data outputted from the comparing means and binary data of "1"; data transferring means for transferring the binary data outputted from the selector as head data to the print head; latch control means for latching data of the print data; and strobe control means capable of causing the print head to expose the light therefrom; whereby the print head is driven in response to the output results of the data transferring means, the latch control means, and the strobe control means to thereby form the gradation image, and also the liquid crystal shutter element is ON/OFF-driven for arbitrary time irrespective of the image data.

Also, an optical printing apparatus, according to a third aspect of the present invention, is featured by such an optical printing apparatus for selectively exposing light emitted from a print head onto a photosensitive recording medium to thereby form a gradation image, in which the print head contains a light source and a plurality of liquid crystal shutter elements, comprising: image data input means for inputting image data; reference level producing means for producing a reference level; comparing means for comparing multi-value data outputted from the image data input means with the reference level so as to convert the multi-value data into binary data; data transferring means for transferring the binary data outputted from the comparing means as head data to the print head; latch control means for latching data of the print data; and strobe control means capable of causing the print head to expose the light therefrom; whereby after the light source was turned ON, a preselected time period has passed, and then the liquid crystal shutter element is ON/OFF-driven; and also the print head is driven in response to the output results of the data transferring means, the latch control means, and the strobe control means to thereby form the gradation image.

Also, an optical printing apparatus, according to a fourth aspect of the present invention, is featured by such an optical printing apparatus for selectively exposing light emitted from a print head onto a photosensitive recording medium to thereby form a gradation image, in which the print head contains a light source and a plurality of liquid crystal shutter elements, comprising: image data input means for inputting image data; reference level producing means for producing a reference level; comparing means for comparing multi-value data outputted from the image data input means with the reference level so as to convert the multi-value data into binary data; data transferring means for transferring the binary data outputted from the comparing means as head data to the print head; latch control means for latching data of the print data; and strobe control means capable of causing the print head to expose the light therefrom; whereby the liquid crystal shutter element corresponding to a non-recording pixel is ON/OFF-driven, while the light source is not turned ON.

Also, an optical printing apparatus, according to a fifth aspect of the present invention, is featured by such an optical printing apparatus for selectively exposing light emitted from a print head onto a photosensitive recording medium to thereby form a gradation image, in which the print head contains a plurality of light sources and a plurality of liquid crystal shutter elements, comprising: image data input means for inputting image data; reference level producing means for producing a reference level; comparing means for comparing multi-value data outputted from the image data input means with the reference level so as to convert the multi-value data into binary data; data transferring means for transferring the binary data outputted from the comparing means as head data to the print head; latch control means for latching data of the print data; and strobe control means capable of causing the print head to expose the light therefrom; whereby the plurality of light sources are switched plural times larger than a total number of the light sources within 1 line.

An optical printing apparatus, according to a sixth aspect of the present invention, is featured by that a shape of the liquid crystal shutter element is formed in such a manner that a length of the liquid crystal shutter element along a sub-scanning direction is made shorter than that along a main scanning direction.

An optical printing apparatus, according to a seventh aspect of the present invention, is featured by that when the light sources are switched, the liquid crystal shutter elements are shielded.

An optical printing apparatus, according to an eighth aspect of the present invention, is featured by that the plurality of liquid crystal shutter elements are positive type liquid crystal elements.

Furthermore, an optical printing apparatus, according to a ninth aspect of the present invention, is featured by that the plurality of liquid crystal shutter elements are TN (twisted nematic) type liquid crystal elements.

BRIEF DESCRIPTION OF THE DRAWINGS

A more better understanding of the present invention may be made of reading a detailed description in conjunction with the accompanying drawings:

FIG. 1 is a schematic block diagram for showing an arrangement of an optical printing apparatus according to an embodiment mode 1 of the present invention.

DETAILED DESCRIPTION OF THE PREFERRED EMBODIMENTS

Embodiment Mode 1

Figure 2A:
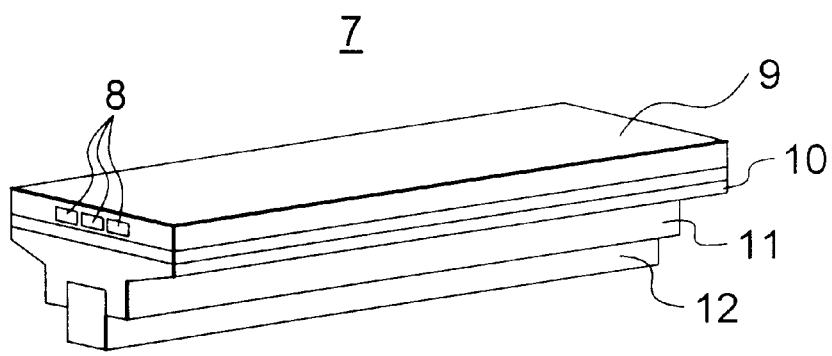
FIG. 2 is a schematic block diagram for indicating a structure of a print head employed in the optical printing apparatus according to the embodiment mode 1 of the present invention.

Referring now to drawings, an optical printing apparatus according to an embodiment mode 1 of the present invention will be described. FIG. 1 is a schematic block diagram for indicating an arrangement of an optical printing apparatus according to this embodiment mode 1 of the present invention. It should be noted that the same reference numerals shown in the respective drawings indicate the same, or similar structural elements. In addition, the arrangement shown in FIG. 1 is applicable to embodiment modes described later.

In FIG. 1, reference numeral 1 indicates image data input means for inputting image data. For example, image data is entered from such an external host computer (not shown) as gradation data via this image data input means 1 into this optical printing apparatus. As the gradation data, when 256-gradation data is selected, values defined from 0 to 255 are entered; when 64-gradation data is selected, values defined from 0 to 63 are inputted; and when n-gradation data is selected, values defined from "0" to "n−1" are entered. Symbol "n" is equal to an integer larger than, or equal to 2.

In this case, as a physical interface, the existing parallel interface regulated by U.S. Centronics Data Computer Inc, the serial interface such as RS232C, wired interfaces such as IEEE1394 and USB (Universal Serial Bus), and wireless interfaces such as infrared communications are utilized. It should also be understood that various sorts of data (pixel numbers, image data, etc.) are transmitted/received between the own optical printing apparatus and the above-explained external host computer (not shown) under control of control means (not shown) in a desirable sequence. For instance, the reception of the image data is controlled together with commands by the control means (not shown) to be entered in a predetermined unit, e.g., either in the unit of 1 line or in the unit of 1 image.

In FIG. 1, reference numeral 2 indicates reference level producing means for producing a reference level. Reference numeral 3 shows comparing means for comparing the output of the image data input means 1 with the output of the reference level producing means 2. The output from the image data input means 1 is given as multi-value data (gradation data). However, as the data which may be used in the normal print head 7, only binary data constructed of "1" (e.g., recording) and "0" (e.g., non-recording) may be entered. As a result, in order to firmly perform n-gradation recording operation, data must be transferred (n−1) times per 1 line (will be referred to as "(n−1) times–transfer mode"). Otherwise, data must be transferred (n) times per 1 line (will be referred to as "(n) times–transfer mode"). In this case, the reason why the data is transferred (n) times is given as follows: That is, the exposure operation is carried out also with respect to the non-recording pixel which corresponds to the image data of To convert 256-value data (namely, output of image data input means 1) into binary data corresponding thereto, both the reference level producing means 2 and the comparing means 3 are employed. In the (n−1) times-transfer mode, the 256-value data is compared with the reference level outputted from the reference level producing means 2 by the comparing means 3. For example, while the reference level is smaller than the 256-value data, this comparing means 3 continuously outputs "1" as the binary data. When the reference level becomes larger than, or equal to the 256-value data, this comparing means 3 continuously outputs "0" as the binary data. In other words, in the case that the output of the image data input means 1 is "n", the comparing means outputs "n" pieces of "1" and (255−n) pieces of "0". On the other hand, in the (n) times-transfer mode, for instance, when the reference level is smaller than, or equal to the 256-value data, this comparing means 3 continuously outputs "1" as the binary data. When the reference level becomes larger than the 256-value data, this comparing means 3 continuously outputs "0" as the binary data. In other words, in the case that the output of the image data input means 1 is "n", the comparing means outputs "n+1" pieces of "1" and (255−n) pieces of "0". It should also be noted that the reference level producing means 2 is constituted by a counter and the like. This counter is reset to "0" at a top of 1 line, and is counted up in synchronism with a clock (not shown) entered into the reference level producing means 2.

Also, in FIG. 1, reference numeral 4 indicates data transferring means for transferring the comparison result of the comparing means 3 as head data to the print head 7. Reference number 5 indicates latch control means for latching data of the print head 7. Reference numeral 6 shows strobe control means capable of exposing the print head 7. Reference numeral 7 indicates a print head. As the print head 7, a light source control type element capable of penetrating light emitted from a light source, or capable of shielding this light may be employed. As this light source control type element, for example, 640 pieces (equal to 640 pixels) of LCD shutter elements are provided in a line shape. While the LCD shutter elements selectively ON/OFF-drive the light emitted from the light source, an image is formed by controlling the penetration time (transmission time) of this light. In this case, as the above-described liquid crystal (LCD) shutter element, for example, twisted nematic type liquid crystal is sealed into glass plates, and furthermore, two sheets of polarization plates are arranged on both sides of the glass plates in such a manner that absorption axes thereof are shifted from each other by 90 degrees. In accordance with this liquid crystal shutter element, when no voltage is applied to this LCD shutter element, this shutter element is brought into a transmission (transparent) condition, whereas when a voltage is applied thereto, this LCD shutter element is brought into a shielded condition. Since the exposure time of this LCD shutter element can be controlled by controlling the voltage non-application time, images containing gradation characteristics can be formed. This structure will be referred to as a positive type liquid crystal shutter element structure.

On the other hand, a negative type liquid crystal shutter element structure is defined as two sheets of polarization plates arranged in such a manner that absorption axes thereof are located parallel to each other. In accordance with this negative liquid crystal shutter element, when a voltage is applied to this negative type LCD shutter element, this shutter element is brought into a transmission (transparent) condition, whereas when no voltage is applied thereto, this LCD shutter element is brought into a shielded condition. Since the exposure time of this LCD shutter element can be controlled by controlling the voltage none-application time, images containing gradation characteristics can be formed. However, the transmittance of the negative type LCD shutter element during the shielded condition is relatively larger than that of the positive type LCD shutter element, the contrast thereof is small, and also the gradation characteristic thereof is poor. As a consequence, the positive type LCD shutter element is preferable as the print head 7.

As to a sort of liquid crystal, there are nematic liquid crystal such as a TN type LCD and an STN type LCD, cholesteric liquid crystal, and smectic liquid crystal typically known as ferroelectric liquid crystal. As the desirable characteristics of the print head 7 mounted on the optical print apparatus, the following characteristic items are required: A high contrast ratio is required; a high response speed is required for a liquid crystal shutter element; a low drive voltage is required; and an anti-shock characteristic must be stable. As an overall evaluation result, it can be concluded that TN type liquid crystal is preferable among these elements. For instance, with respect to the contrast ratio, the TN type LCD can own the contrast ratio more than 10 times higher than that of the STN type LCD. As to the anti-shock characteristic, the TN type LCD becomes stable rather than the smetic LCD.

Figure 2B:
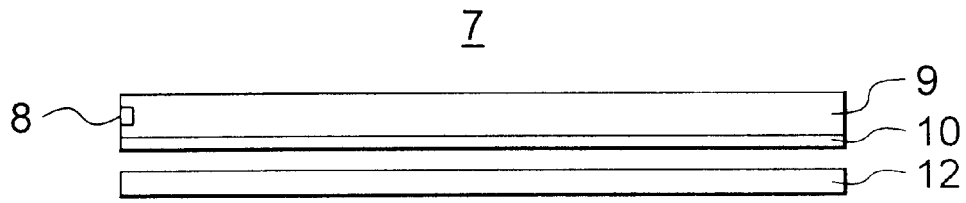

FIG. 2 schematically shows a structural example of the print head 7. FIG. 2(a) is a perspective view of this print head 7, and FIG. 2(b) is a front view of this print head 7. Reference numeral 8 indicates a light source. This light source 8 is constituted by a self-light emitting type light source such as an LED and an EL. In a color recording operation, three sets of red-colored-light light source, green-colored-light light source, and blue-colored-light light source are employed, whereas in a monochromatic recording operation, either a white-colored-light light source or a mono-color light source is used. This light source construction may have merits of low cost and small apparatus size, as compared with the conventional construction with employment of the halogen light source 100 and the color LCD shutter 101. Also, this light source construction may have a merit of switching speeds when the light source 8 is used in the switching manner.

Furthermore, in FIG. 2, reference numeral 9 indicates a light conducting tube for uniformly irradiating light on a liquid crystal shutter board 10 (will be discussed later). This light conducting tube 9 is constituted by the above-explained acrylic rod and the like. Reference numeral 10 shows a liquid crystal shutter board on which, for example, 640 pieces of liquid crystal shutter elements (not shown) are arranged. In such a case that three sets of red, green, and blue-colored-light light sources are switched to be selectively used, this liquid crystal shutter board 10 may be arranged by a single column of LCD shutter array. When the LCD shutter elements correspond to each of these three red, green, and blue-colored-light light sources, this liquid crystal shutter board 10 is constituted by 3 columns of LCD shutter arrays. Also, reference numeral 11 indicates a holder which may hold thereon the above-explained light conducting tube 9, liquid crystal shutter board 10, and a SELFOC lens array (tradename) 12. This holder 11 may be commonly used in combination with a housing (not shown) for shielding an entire portion.

Figure 3:
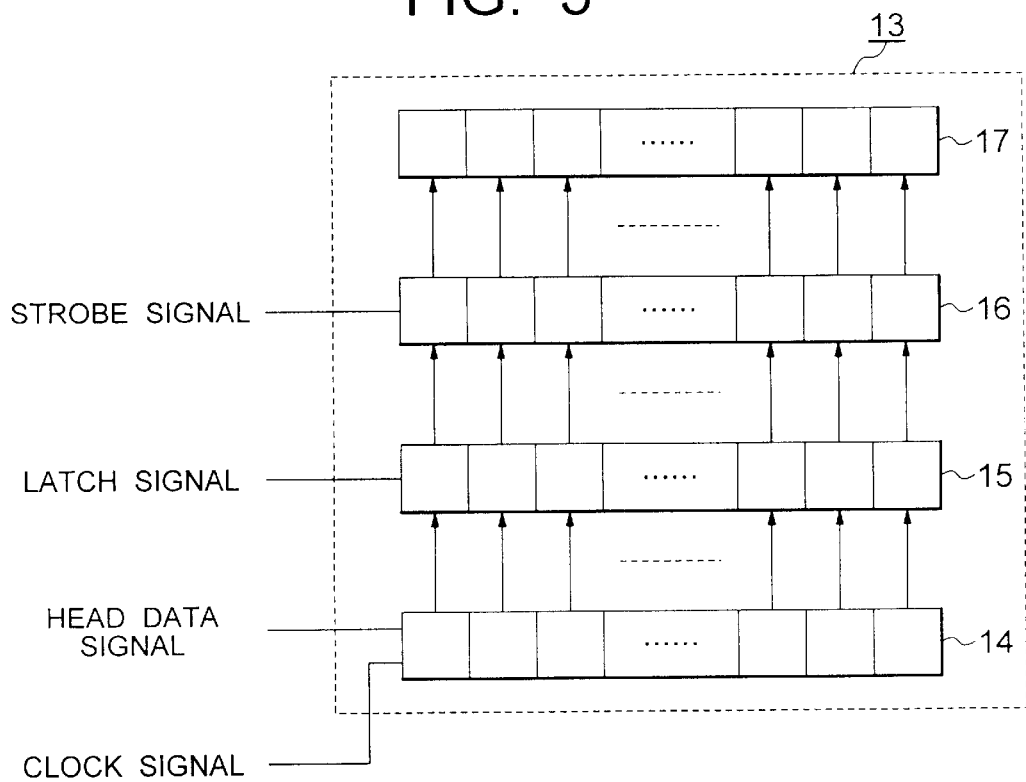
FIG. 3 illustratively shows an IC structure of the print head employed in the optical printing apparatus according to the embodiment mode 1 of the present invention.

Also, FIG. 3 schematically shows a structural example of a drive IC for driving the LCD shutter elements mounted on the LCD shutter board 10. In FIG. 3, reference numeral 13 indicates an IC (integrated circuit), and reference numeral 14 shows a shift register for sequentially shifting a head data signal (binary data) corresponding to the output derived from the data transferring means 4 in synchronism with a clock signal (not shown). Also, reference numeral 15 denotes a latch for latching the output derived from the shift register 14 in synchronism with the latch signal corresponding to the output derived from the latch control means 5, and reference numeral 16 shows a driver for driving the liquid crystal shutter element 17, namely for applying a voltage thereto in response to the output of the latch 15 and the strobe signal corresponding to the output of the strobe control means 6.

Next, printing operation of the above-explained optical printing apparatus according to this embodiment mode 1 will now be described with reference to drawings.

First, in FIG. 1 and FIG. 3, the image data entered into the image data input means 1 is compared with the output (reference level) derived from the reference level producing means 2 by the comparing means 3 (namely, data for print head 7 is produced), and then, the print head 7 is ON/OFF-driven by the data transferring means 4, the latch control means 5, and the strobe control means 6.

Figure 4:
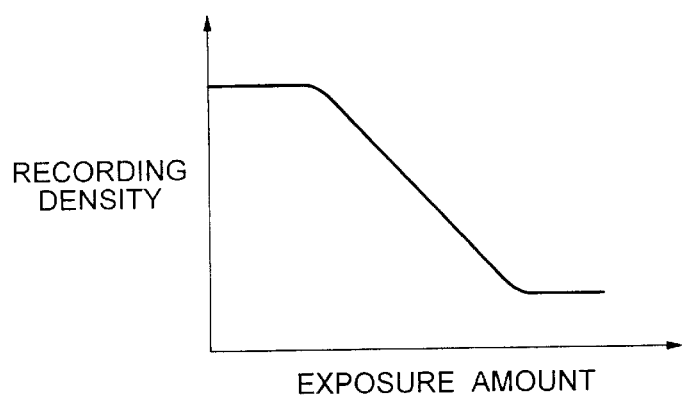
FIG. 4 is a graphic diagram for indicating a density characteristic of the optical printing apparatus according to the embodiment mode 1 of the present invention.

A recording density characteristic of a photosensitive recording medium (not shown) normally owns such a characteristic as in FIG. 4 with respect to an exposure amount (namely, exposure amount is defined by an amount of light penetrated through LCD shutter element 17 and light penetration time). As a result, when the exposure time (namely, width of strobe signal) is made constant at every gradation, the density every gradation cannot become constant, so that the reproducibility of highlight portion and also shadow portion cannot be obtained. As a result, while the exposure time is controlled every gradation, such a control operation is carried out in order that both the recording density and the gradation characteristic represent linear characteristics.

Figure 5:
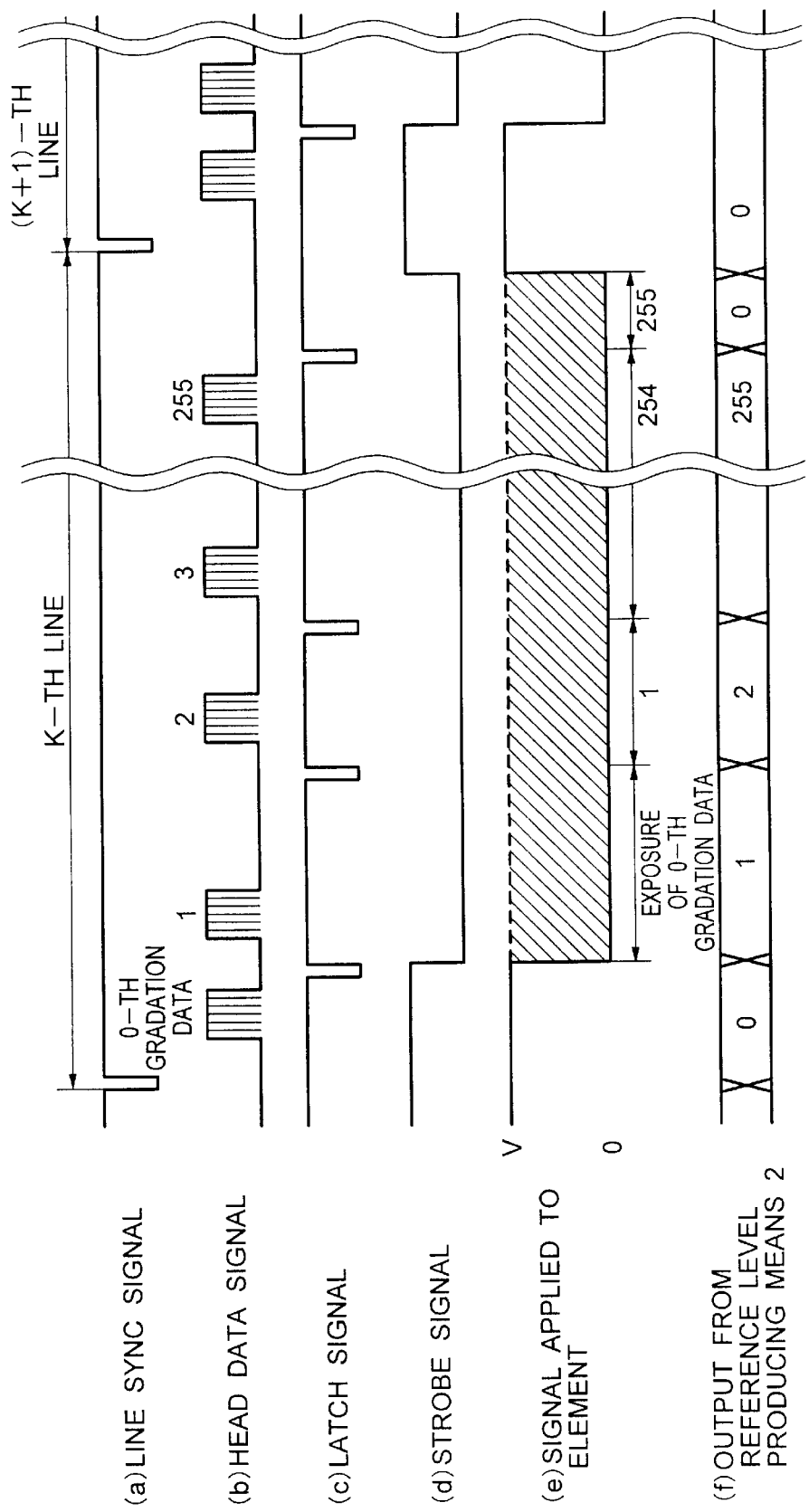
FIG. 5 is a timing chart for indicating operations of the optical printing apparatus according to the embodiment mode 1 of the present invention.

FIG. 5 is a diagram for schematically showing a concrete method used to drive the print head 7 in the (n) time-transfer mode. In FIG. 5(a), a line sync (synchronization) signal outputted from the control means (not shown) is equal to a sync signal of each of lines, and a pulse interval of line sync signals constitutes a recording time period. This recording time period which depends upon the sensitivity of the photosensitive recording medium, is substantially equal to 0.5 ms to 3 seconds.

As the drive operation, first of all, the reference level producing means 2 is reset by the control means (namely, "0" is outputted) in synchronism with a falling signal of a line sync signal. Then, the image data is compared with the reference level by the comparing means 3. For instance, when the image data outputted is a data stream such as "0", "128", "255", - - - , "1", the image data is converted into binary data such as all of "1" as 0th-gradation data, and the data transferring means 4 supplies to above-explained binary data (head data signal) to the print head 7, which is synchronized with a head clock signal (not shown). Concretely speaking, this data transferring means 4 outputs the binary data to the shift register 14 shown in FIG. 3.

Then, in response to an instruction issued from the control means (not shown), the latch control means 5 outputs a latch signal. This instruction implies that the transfer operation of the gradation data has been completed. Then, based upon this latch signal, the reference level producing means 2 is incremented. Also, in response to this latch signal, the data stored in the shift register 14 is latched by the latch 15, and also this data of the shift register 14 is converted into binary data of a first-gradation data stream (namely, when image data corresponds to such a data stream as "0", "128", "255" - - , "1", this first-gradation data stream is equal to "0", "1", "1", - - -, "1"). This converted first-gradation data stream is entered into the shift register 14 within the print head 8.

On the other hand, in response to another instruction issued from the control means (not shown) by receiving this latch signal, the strobe control means 6 enables the strobe signal. This instruction instructs that the latch signal of the 0th-gradation data is outputted. Then, inside the print head 7, when both the data latched in the latch 15 and the strobe signal derived from the strobe control means 6 are entered into the driver 16, the LCD shutter element 17 is selectively driven by a desirable voltage (V and 0), so that the data recording operation with respect to the 0th-gradation data is carried out by this print head 7. Furthermore, a similar data recording operation is repeatedly carried out within 1 line, so that an image of 1 line can be formed. Since a similar data recording apparatus is repeated in the unit of 1 line, an image forming operation for 1 screen can be accomplished.

As previously described in detail, in accordance with this embodiment mode 1, the advantages are as follows. That is, since the ON/OFF-drive operation is carried out also for an LCD shutter element 17 corresponding to the non-recording element (equivalent to image data "0"), the variations contained in the density can be mitigated. These density variations are caused by the historical differences, or the differences in the driving intervals. As a result, it is possible to obtain the optical printing method/apparatus capable of realizing high image quality recording operation.

In other words, since the LCD shutter element 17 is driven irrespective of the image data, either the historical differences or the differences in the drive intervals can be reduced. In particular, in the recording characteristic shown in FIG. 4, this specific effect may be achieved if a ratio of such a region where even when the exposure amount, is increased, the recording density is not changed to the overall exposure amount is increased. Also, the characteristic of the aging change can be mitigated, so that the high image quality recording operation can be carried out under stable condition. This aging change will occur in the case where extreme images are continuously recorded, namely, the transmittance of the element corresponding to the recording element is lowered, as compared with that of the element corresponding to the non-recording element.

Figure 6:
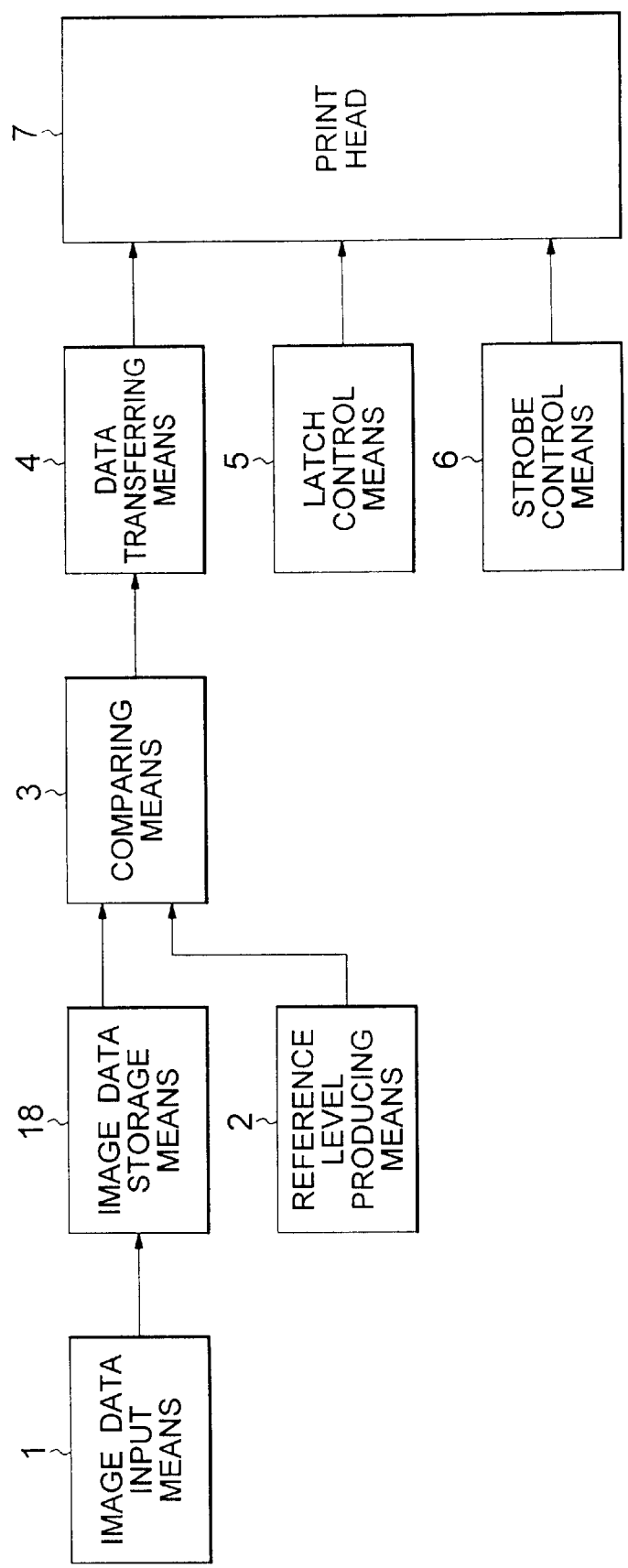
FIG. 6 is a schematic block diagram for showing an arrangement of a modification of the optical printing apparatus according to the embodiment mode 1 of the present invention.

In accordance with this embodiment mode, various modifications and various combinations may be realized without departing from the technical scope and spirit of the present invention. For example, in the above-described embodiment mode 1, the optical printing apparatus is arranged in such a manner that the data are received plural times (256 times in the above example) within 1 line from the external host computer (not shown). Alternatively, in order to shorten the data transfer time between the external host computer and the own optical printing apparatus, such an image data storing means 18 for temporarily storing thereinto a prese-lected capacity (e.g., 1-line data capacity and 1-screen data capacity) of image data may be provided, as indicated in FIG. 6. In this alternative case, the address of the image data storage means 18 may be controlled by the control means (not shown), so that the image data are stored in the desirable order. Alternatively, the image data are outputted to the comparing means 3 in a desirable order.

Furthermore, in the above-described embodiment, a plurality of head data signals corresponding to the output of the data transfer means 4 are transferred at every gradation, which are equal to a total element number of LCD shutter elements 17 of the print head 7. Alternatively, in order to increase the data transfer speed with respect to the print head 7 (namely, in order to shorten recording period), a plurality of data may be transferred in a parallel mode. As this alternative arrangement, for example, into an image data storing means 18, image data of 1 line (for instance, while 640 elements are employed in print head 7, when image data of 1 line are assumed as 640 pixels) are stored, while the image data of 1 line are subdivided into two image data blocks. That is, one image data block is defined from first image data up to 320-th image data, and the other image data block is defined from 321st image data up to 640-th image data. Next, the first image data and the 321st image data are outputted substantially at the same time at a desirable timing. Also, the first image data is compared with the 321st image data by the comparing means 3, and then the comparison result may be entered via the data transfer means 4 to the print head 7.

In this case, since there are provided two sets of head data signals, the transfer time may be reduced by ½. As previously explained, the present invention is not limited to the two head data signals, but for example, more than 3 sets of such head data signals. Also, a plurality of latch signals and/or a plurality of strobe signals may be provided. Furthermore, in such a case that the plural head data signals, the plural latch signals, and the plural strobe signals are employed, temporal phase differences may be given thereto.

Also, in the above-described embodiment mode 1, the output of the reference level producing means 2 is incremented as "0", "1", - - - . Alternatively, this output may be decremented as "254", "253", - - - . Also, while the reference levels outputted from the reference level producing means 2 are selected to be "0", "0", "1", "2", - - - , the elements corresponding to the image data of "0", and "1" may be driven. Alternatively, the above-explained ON/OFF-drive operation may be carried out with respect to not only the 0th-gradation data, but also a plurality of gradation data. Also, while the image data corresponding to the non-recording pixel is selected not to be "0", but to be "1", even when the (n−1) times-transfer mode is employed, a similar effect may be achieved. These conditions may be properly changed, depending upon the structure of the print head 7. In addition, when the color recording operation is carried out, this optical printing apparatus may be constructed as follows: That is, while a white-colored-light light source is employed as the light source 8, the respective colored light may be irradiated via a color filter (not shown). Also, a similar effect may be achieved even when the LCD shutter elements 17 are arranged in a single column, or a plurality of columns.

Furthermore, in the above-described embodiment mode 1, "since the recording density characteristic of the photosensitive recording medium owns such a characteristic as shown FIG. 4 with respect to the normal exposure amount, the exposure time is controlled at every gradation in such a manner that both the recording density and the gradation characteristic may represent the linear characteristic." The exposure amount is equal to a product made by a light amount of light penetrated through an element and light penetration time. Alternatively, the exposure time may be controlled in such a manner that lightness, luminance, and the gradation characteristic may represent the linear characteristic. Also, such a photosensitive recording medium that recording density thereof is increased in response to an increase of an exposure amount may be employed, and therefore, there is no limitation.

In addition, in the above-explained embodiment mode 1, while the light source 8 is employed, the print head 7 is irradiated from a single side surface of this print head 7. Alternatively, the print head 7 may be irradiated from either both side surfaces thereof or an upper side surface thereof, and the present invention is not limited thereto. Also, the liquid crystal shutter elements 17 employed in the print head 7 may be arranged in a straight form, or a staggered form, and therefore, the present invention is not limited thereto.

Also, the LCD shutter element 17 is driven by the DC manner, but may be alternatively driven by an AC manner in the above embodiment mode 1. Also, the LCD shutter element 17 is brought into the transmission state when no voltage is applied thereto. Alternatively, even when the print head 7 is arranged so that the LCD shutter element 17 is brought into the transmission state and when a voltage is applied thereto, a similar effect may be achieved. Furthermore, the LCD shutter elements 17 are driven in the batch mode in the embodiment mode 6. Alternatively, while a plurality of strobe control means 6 are prepared, the LCD shutter elements 17 may be subdivided, and the subdivided LCD shutter elements may be driven. In this alternative case, there is a merit in a reduction of power consumption. In addition, the optical printing apparatus may be arranged by such a manner that not only the monochromatic image may be formed, but also a color image may be formed by exposing light with a plurality of wavelengths.

Embodiment Mode 2

Figure 7:
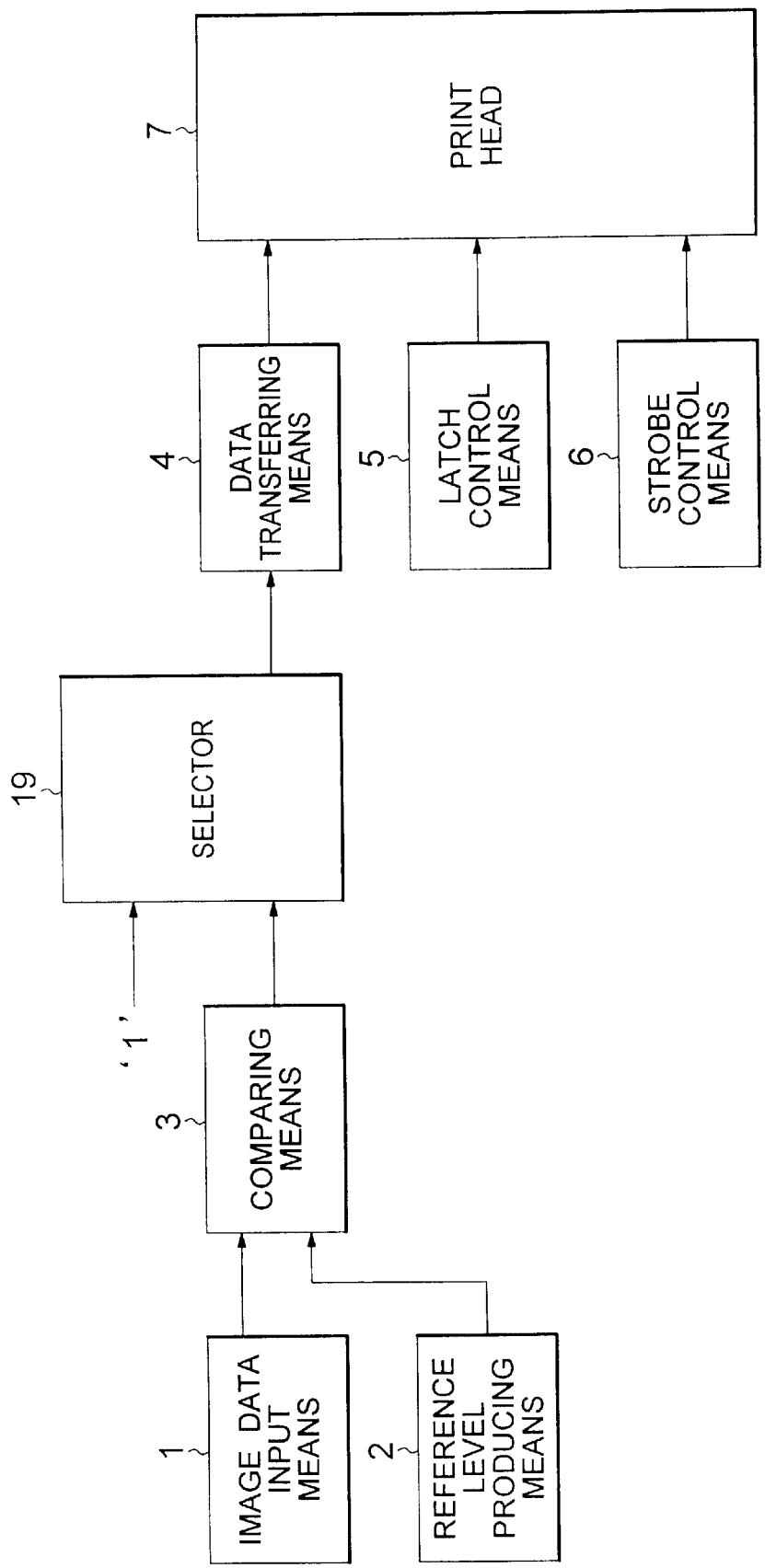
FIG. 7 is a schematic block diagram for showing an arrangement of an optical printing apparatus according to an embodiment mode 2 of the present invention.

Referring now to drawings, an optical printing apparatus according to an embodiment mode 2 of the present invention will be described. FIG. 7 is a schematic block diagram for indicating an arrangement of the optical printing apparatus according to this embodiment mode 2 of the present invention.

In FIG. 7, reference numeral 19 shows a selector. This selector 19 selects any one of an output derived from a comparing means 3 and binary data of "1". It should be noted that the same reference numerals shown in FIG. 1 will be employed as those for denoting the same, or similar components of FIG. 7.

Next, printing operation of this optical printing apparatus according to the embodiment mode 2 will now be explained with reference to drawings.

For instance, 256-value data is entered into the image data input means 1. These data values are sequentially compared with the output (reference level) derived from the reference level producing means 2 by the comparing means 3. Then, under control of a control means (not shown), the selector 19 selects one of the output derived from the comparing means 3 and the binary data of "1" to output the selected data to the data transferring means 4. This data transferring means 4 supplies this data as a head data signal to the print head 7.

Figure 8:
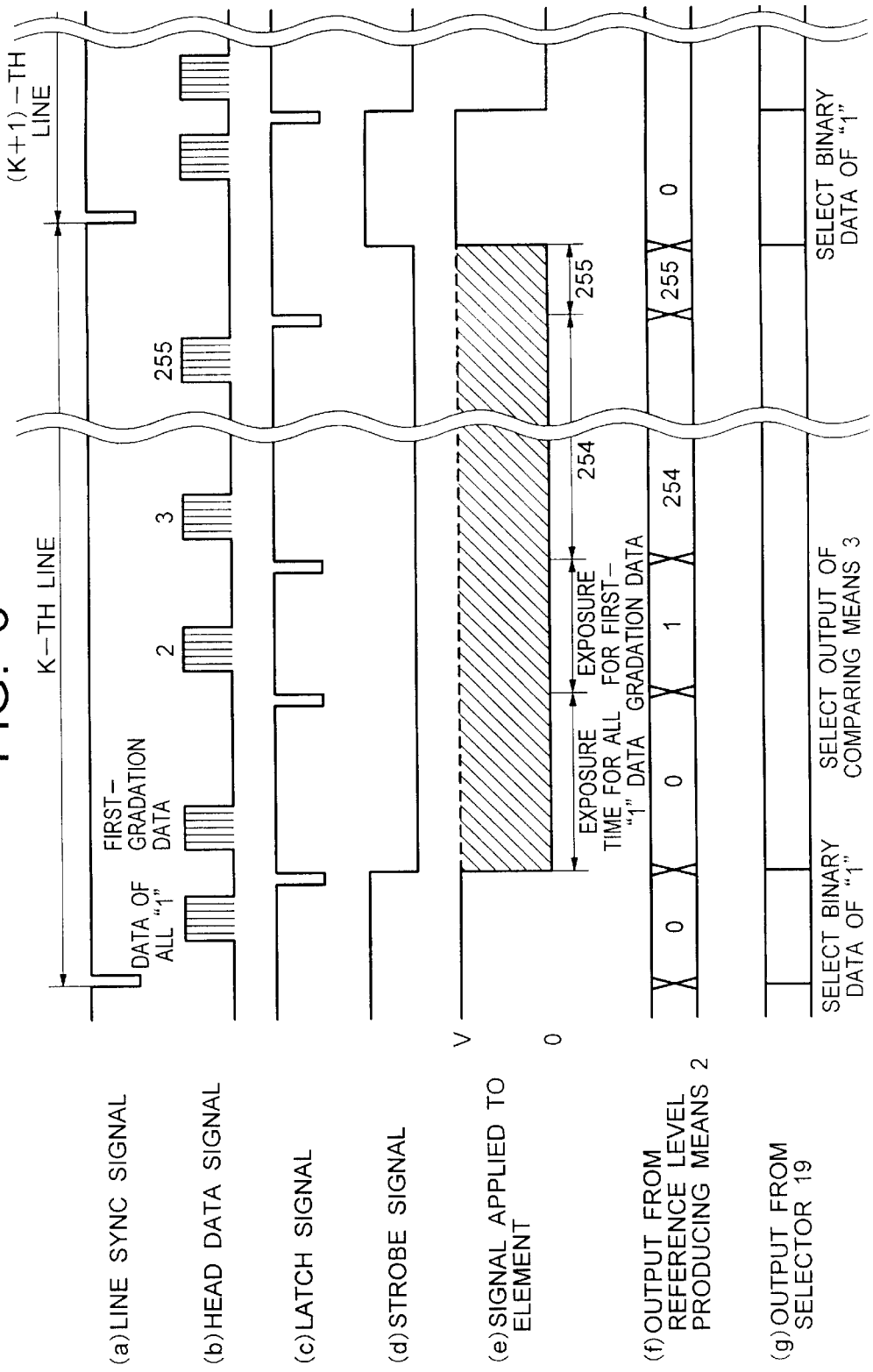
FIG. 8 is a timing chart for indicating operations of the optical printing apparatus according to the embodiment mode 2 of the present invention.

FIG. 8 is a timing chart for representing a concrete method used to drive the print head 7. This mode corresponds to the (n−1)-times transfer mode. As the drive operation, first of all, the reference level producing means 2 is reset by the control means (namely, "0" is outputted) in synchronism with a falling signal of a line sync signal shown in FIG. 8(a). Furthermore, the control means (not shown) instructs the selects 19 to output data (namely, binary data of "1") appearing on the upper side thereof. Under this condition, the binary data of "1" is outputted irrespective of the image data.

Next, in the data transferring means 4, binary data which is synchronized with a head clock signal (not shown) is supplied to the print head 7. Then, in response to an instruction issued from the control means (not shown), the latch control means 5 outputs a latch signal. This instruction implies that the transfer operation of the first data has been completed. The control means (not shown) instructs the selector 19 to select data (namely, data outputted from comparing means 3) appearing on the lower side thereof. Also, in response to this latch signal, the data stored in the shift register 14 is latched by the latch 15, and a data stream corresponding to the first-gradation data is entered into the shift register 14 within the print head 7.

On the other and, in response to another instruction issued from the control means (not shown) by receiving this latch signal, the strobe control means 6 enables the strobe signal. This instruction instructs that the first latch signal is outputted. Then, inside the print head 7, when both the data latched in the latch 15 and the strobe signal derived from the strobe control means 8 are entered into the driver 16, the LCD shutter element 17 is selectively driven by a desirable voltage, so that the data recording operation equal to the first time (binary data of all "1") is carried out. Furthermore, the reference level producing means 2 is incremented at a desirable timing. Then, a similar data recording operation is repeatedly carried out within 1 line. As a result, the 1-line image forming operation is accomplished. Additionally, these similar operations are repeatedly carried out, so that an image forming operation for 1 screen can be accomplished.

As previously described, the optical printing apparatus according to this embodiment mode 2 owns the following effects. That is, since the LCD shutter element 17 can be driven in a constant interval irrespective of the image data, the variations contained in the density can be mitigated. These density variations are caused by the historical differences, or the differences in the driving intervals. As a result, it is possible to obtain the optical printing method/apparatus capable of realizing the high image quality recording operation.

It should be understood that various modifications and changes may be made in this embodiment mode 2. Similar to various changes as described in the embodiment mode 1, while an image data storage means 18 is provided, data transfer time between the own optical printing apparatus and an external host computer (not shown) may be shortened, and also while a plurality of head data signals are employed, highspeed recording operations may be realized.

Also, in the above-described embodiment mode, the reference level producing means 2 is incremented, and the enable timing of the strobe signal is triggered by receiving the latch signal, but which may be realized based upon information supplied from the control means (not shown). Also, the latch signal for the first time may be employed at such timing when the selector 19 selects its output, and the present invention is not limited thereto. Moreover, for example, this selector 19 may be arranged at the post stage of the data transferring means 4, and this selector 19 may be arranged by using a logic circuit, or may be properly changed.

Also, as shown in FIG. 9(f) and FIG. 9(g), after the data have been transferred 255 times, the output of the selector 19 is switched to the upper side (namely, binary data of "1"), and the exposure operation may be carried out by using the binary data of all "1". Also, there is a similar effect by that even when the output of the selector 19 is switched at an arbitrary time within 1 line, the exposure operation is carried out by employing the binary data of all "1".

Embodiment Mode 3

Referring now to drawings, an optical printing apparatus according to an embodiment mode 3 of the present invention will be described. This embodiment mode 3 is accomplished by that this optical printing apparatus is capable of performing a high image quality recording operation as follows: That is, in this optical printing apparatus, while a drive sequence of a light source 8 is clearly discriminated from a drive sequence of a liquid crystal (LCD) shutter element 17, stable light emitted from the light source 8 is selectively driven by the liquid crystal shutter element 17.

Figure 10:
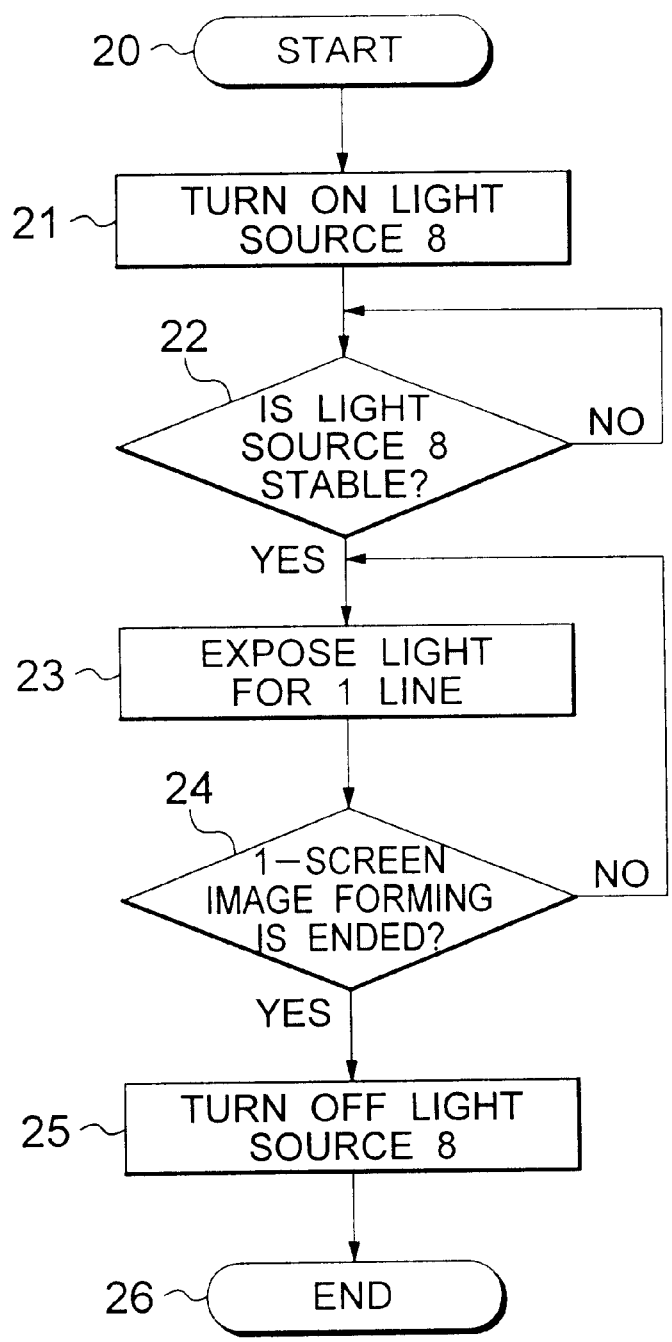
FIG. 10 is a flow chart for describing operations of an optical printing apparatus according to an embodiment mode 3 of the present invention.

Next, printing operation of the optical printing apparatus according to this embodiment mode 3 will be described with reference to FIG. 1, FIG. 2, and FIG. 10. FIG. 10 is a flowchart for describing a sequential operation of this optical printing apparatus for forming an image by using the print head 7 shown, for example, in FIG. 2(a). As to this print head 7, a description will now be made of such a case that while 3 sets of red-colored-light light source, green-colored-light light source, and blue-colored-light light source are employed, 3 columns of LCD shutter elements 17 corresponding to these 3 color light sources are provided. In this structural example, the respective columns of the LCD shutter elements 17 are internally partitioned in order not to mix the red light (red-colored-light), the green light (green-colored-light), and the blue light (blue-colored-light) with each other.

In FIG. 10, first of all, the printing operation of this optical printing apparatus starts from a step 20. Next, the respective light sources 8 are turned ON by the control means (not shown) at a step 21. Then, the control means checks as to whether or not these light sources 8 can emit the red/green/blue light under stable conditions (step 22). This checking step is required so as to avoid the below-mentioned problems. That is, if the LCD shutter elements 17 are selectively driven so as to form a desirable image before the light sources 8 are operable under stable conditions, then the transmittance thereof becomes low, so that such a desirable image cannot be eventually formed. Also, since the light sources 8 are operated under unstable transmission condition, the image quality of this desirable image is deteriorated. Therefore, in order to solve these problems, it is an effective way that the LCD shutter elements 17 are not driven for producing the image, namely are brought into the shielded condition until the light sources 8 may be brought into the stable conditions.

The time periods required to stabilize the operations of the light source 8 are different from each other, depending upon the sorts of the light sources 8. There are the following methods capable of not driving (exposing) the LCD shutter element 17 until the operations of the light source 8 can be brought into the stable conditions:

(1). An optical sensor and the like (not shown in detail) are provided in the vicinity of the light source 8, or the LCD shutter element 17 so as to actually measure a light amount. When the measured light amount reaches a preselected light amount, the exposing operation of the LCD shutter element 17 is commenced.

(2). While the stabilizing characteristic of the light source 8 is previously acquired by way of the experiment, the time period required for stabilizing the light source 8 is stored into the control means (not shown). After the light source 8 has been turned ON, the above-described stabilizing time period is utilized as a waiting time period. Thereafter, when this stabilizing time period has passed, the exposing operation of the LCD shutter element 17 is commenced.

(3). While the stabilizing characteristic of the light source 8 is previously acquired by way of the experiment, the following work operations are carried out for a certain time period longer than this stabilizing time period. For example, as the work operations, image data is received from a host computer (not shown), and the print head 7 is moved. After these work operations have been carried out, the exposing operation of the LCD shutter element 17 is commenced. In this case, the time period required for stabilizing the light source 8 implies such a time period that after the light source 8 has been turned ON, the exposing operation of the LCD shutter element 17 is commenced in order to form the desirable image. Alternatively, the above-explained methods (1) to (3) may be properly combined with each other.

Next, at a step 23, the LCD shutter elements for 1 line are exposed in accordance with the above-explained driving method. Then, while either the photosensitive recording medium (not shown) or the print head 7 are relatively moved, the printing operation of the optical printing apparatus is repeatedly performed until forming of 1 screen image is accomplished at a step 24. After 1 screen image has been formed, the light source 8 is turned OFF (step 25). Then, a series of sequential operation is ended (step 26).

As previously explained, in accordance with the optical printing apparatus of this embodiment mode 3, after the light source 8 is turned ON and then is operated under stable condition, the LCD shutter element 17 is driven (exposed) so as to form the desirable image. As a consequence, there is such an advantage that the high image quality recording operation can be carried out under stable condition. Furthermore, since the time period defined after the light source 8 has been turned ON until the LCD shutter element 17 is driven can be clearly defined (namely, light source 8 can be turned ON only during required time), there is another advantage that the low power consumption can be achieved.

Also, in this embodiment mode 3, various modifications and changes as explained in the above-described embodiment modes 1 and 2 may be achieved. For instance, while the LCD shutter element 17 is arranged in one column, the light sources 8 may be switched within 1 line, or every 1 color.

Figures 11, 12:
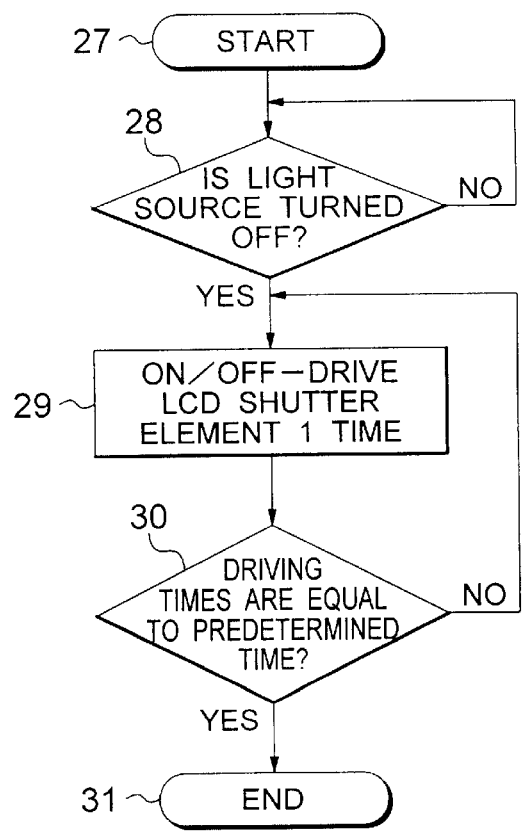
FIG. 11 is a diagram for representing a temperature compensation of the optical printing apparatus according to the embodiment mode 3 of the present invention.
FIG. 12 is a flow chart for describing operations of an optical printing apparatus according to an embodiment mode 4 of the present invention.

Also, as shown in FIG. 11, while a relationship between the time required for stabilizing the light source 8 and the temperature is stored in the control means (not shown), a fine sequence control operation may be carried out. In this alternative case, a temperature detecting element (thermistor: not shown) is provided near the light source 8 so as to detect the temperature (namely, temperature of light source 8). In addition, this temperature detection element is employed, so that a change in light amounts, which is caused by increasing the temperature of the light source 8, may be used to correct the exposure amount in a table format.

Embodiment Mode 4

Referring now to drawings, an optical printing apparatus according to an embodiment mode 4 of the present invention will be described. This embodiment mode 4 is accomplished by such an optical printing apparatus that a liquid crystal shutter element 17 is ON/OFF-driven without turning ON a light source 8 so as to form a desirable image under stable condition irrespective of a past drive condition of this LCD shutter element 17.

Concretely speaking, the LCD shutter element 17 owns such a problem that transmittance thereof is varied, depending upon a past drive condition due to a basic characteristic thereof. For example, the transmittance of the LCD shutter element 17 which has not yet been used for a long time period is different from that of the LCD shutter element 17 which is usually used. As a result, an image quality of a formed desirable image is deteriorated.

In accordance with this embodiment mode 4, while the LCD shutter element 17 is ON/OFF-driven without turning ON the light source 8, a difference in the past drive conditions may be mitigated. It is now assumed that the implication "LCD shutter element 17 is ON/OFF-driven without turning ON light source 8" may involve such a short-time ON/OFF driving operation that even if the LCD shutter element 17 is ON/OFF-driven with turning ON the light source 8, then no adverse influence is given to image forming operation by a photosensitive recording medium. There is no specific limitation in the timing and numbers when the LCD shutter element 17 is ON/OFF-driven. For example, the LCD shutter element 17 may be arbitrarily ON/OFF-driven after the power supply of the optical printing apparatus is turned ON; while the image for 1 line is formed; before/after the image for 1 line is formed; after one-colored image is formed; or after images for several screens are formed.

Referring now to FIG. 12, printing operation of the optical printing apparatus according to this embodiment mode 4 will be explained. FIG. 12 is a flow chart for explaining a sequential operation in the case that the printing operation according to this embodiment mode 4 is carried out with employment of the print head 7 shown in FIG. 2(a). As the print head 7, the following structure is described. That is, for instance, while 3 sets of red/green/blue-colored-light light sources 8 are provided and also the LCD shutter element 17 is arranged in a single column, the light sources 8 are switched three time within 1 line to thereby form a desirable image.

In the printing operation, first of all, this printing operation by the optical printing apparatus is commenced at a step 27. Next, the control means (not shown) confirms as to whether the red/green/blue-colored-light light sources 8 are turned OFF, or are under OFF states (step 28). Then, the LCD shutter element 17 is ON/OFF-driven 1 time under control of this control means (step 29). Furthermore, this LCD shutter element 17 is repeatedly ON/OFF-driven until the ON/OFF-drive time reaches a preselected repetition time which is stored in the control means (not shown) at a step 30. When this ON/OFF-drive time reaches a predetermined repetition time, this sequential operation is accomplished at a step 31.

As the method for ON/OFF-driving the LCD shutter element 17 one time, while such an arrangement as shown in FIG. 7 is employed, the upper side of the selector 19 may be selected. Alternatively, while such an arrangement as indicated in FIG. 6 is used, such image data may be produced by which a specific LCD shutter element 17, or the overall LCD shutter element 17 are ON/OFF-driven. Further, while ON/OFF-driving image data is produced by the control means (not shown), the above-explained sequential operation may be carried out.

As previously explained in accordance with the optical printing apparatus of this embodiment mode 4, since the LCD shutter element 17 is ON/OFF-driven without turning ON the light source 8, there is a merit that the high image quality recording operation can be carried out under stable condition irrespective of the past ON/OFF state.

It should be noted that various modifications and changes as previously described in the embodiment modes 1 to 3 may be realized also in this embodiment mode 4. For example, while the LCD shutter elements 17 may be arranged in three columns, or a plane-shaped manner, a plurality of light sources 8 may be employed. Alternatively, even when the light sources 8 are arranged in a line shape, or a plane shape instead of a point shape, a similar effect may be achieved.

Furthermore, in FIG. 1, the binary data is inputted into the print head 7. Alternatively, while such a print head 7 capable of entering multi-value data is employed, a total number of data transfer operations may be reduced.

Also, as the wavelength of the light emitted from the light source 8, not only visible light, but also infrared rays and ultraviolet rays may be similarly used. Alternatively, a light source having either a narrow wavelength range or a wide wavelength range may be employed. Also, there is no limitation in a total number of light sources 8.

In addition, at the previous step 29 of FIG. 12, the LCD shutter element 17 is ON/OFF-driven one time, otherwise may be ON/OFF-driven plural times. In this alternative case, the process operation defined at the step 30 may be deleted from this flow chart. Also, at the step 28, the optical printing apparatus may be brought into a waiting state for a predetermined time period until the light source 8 can be firmly turned OFF, and the present invention is not limited thereto.

Embodiment Mode 5

Referring now to drawings, an optical printing apparatus according to an embodiment mode 5 of the present invention will be described. This embodiment mode 5 is accomplished by such an optical printing apparatus that while, for example, three sets of red/green/blue-colored-light light sources 8 are employed and an LCD shutter element 7 is arranged in a single column, the light sources 8 are switched three times within 1 line so as to form a desirable image.

Figure 13:
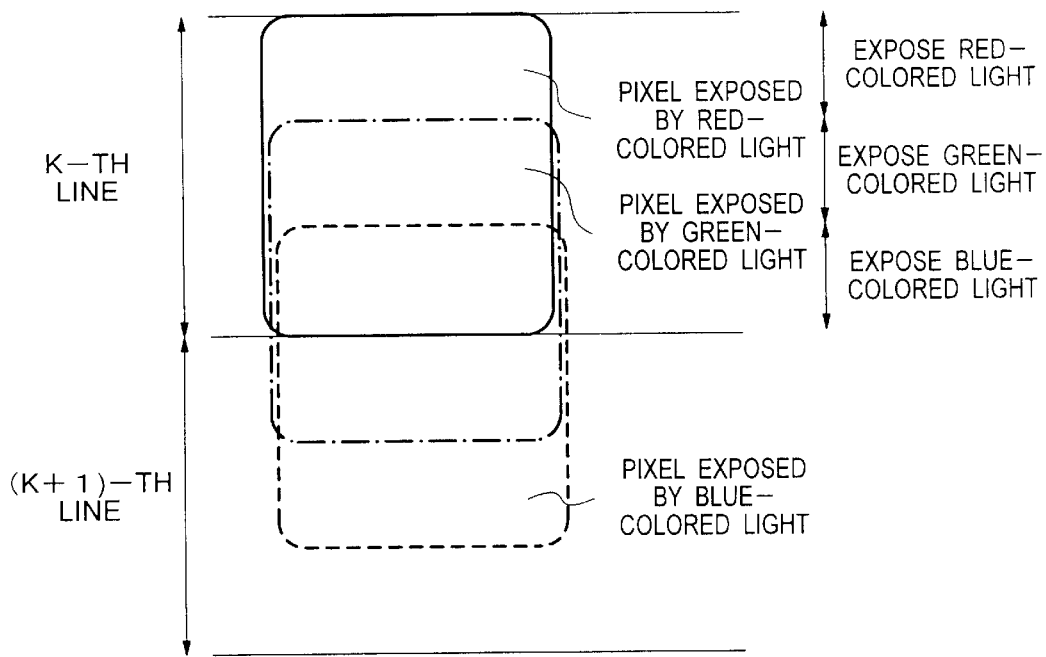
FIG. 13 is a diagram for indicating operations of an optical printing apparatus according to an embodiment mode 5 of the present invention.

FIG. 13 is an illustration for indicating a condition of image forming operation in an enlarging form, in which the red/green/blue-colored-light light sources 8 are switched three times within 1 line in order to form a desirable image. To switch the light sources 8 three times within 1 line (there is a slight difference caused by sensitivity of photosensitive recording medium), the recording time period of 1 line is substantially equally subdivided into 3 time periods. Within 3 subdivided recording time periods, red-colored light, green-colored light, and blue-colored light are exposed. At this time, since the print head 7 and the photosensitive recording medium are relatively moved, this photosensitive recording medium is exposed by the respective colored light, and the formed pixels are not overlapped with each other on the same position, resulting in a color shift.

Figure 14:
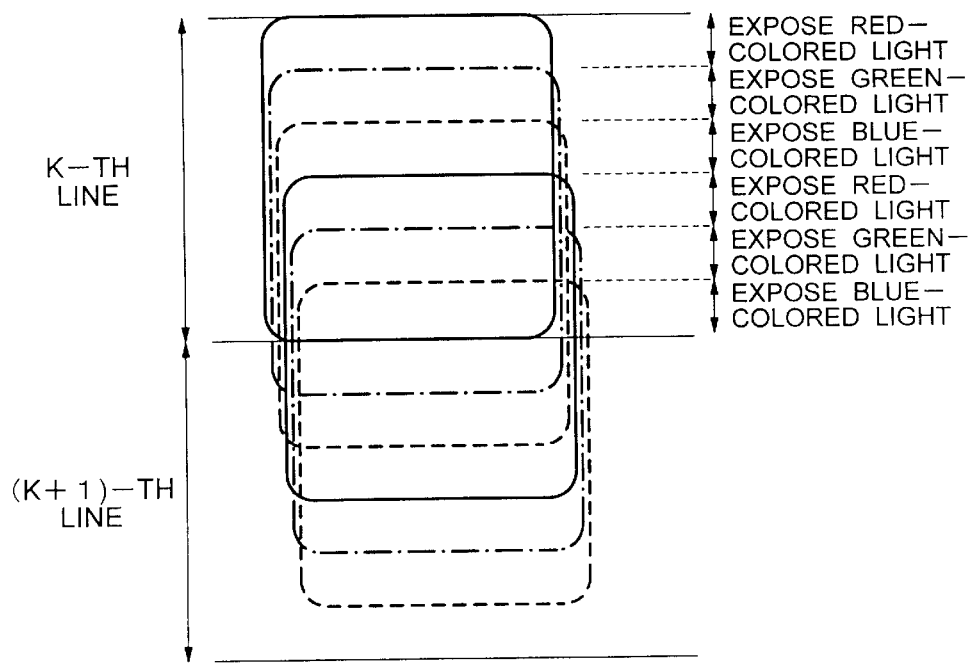
FIG. 14 is a diagram for indicating operations of the optical printing apparatus according to the embodiment mode 5 of the present invention.

The optical printing apparatus according to this embodiment mode 5 is directed to such an operation that while the light emitted from the light sources 8 are switched plural times within 1 line, the color shift may be mitigated by using an integration capability of a human eye. FIG. 14 illustrates such an operation that the light sources 8 are switched 6 times within 1 line. In accordance with this switching operation of the light sources, the color shifts occurred in each color can be reduced by ½. It should be understood that for the sake of easy explanation, the recorded pixels are shifted along the right-side direction.

A major point of this embodiment mode 5 is a total number of switching operations of the light sources 8. Depending upon the sort of light sources 8, the total switching times may be selected to be larger than a total number of light sources 8, or colored light. There is no specific limitation in the switching order of these light sources 8. For example, while utilizing an integration capability of a human eye and also a color sensitivity characteristic of a human eye, in such a case that 3 sets of light sources 8 for emitting visible light are employed, these colored-light light sources 8 may be switched 5 times in this color order of red, green, blue, green, and blue. In the case that two sets of light sources 8 for emitting ultraviolet rays are employed, the light sources 8 may be switched in this order of ultraviolet ray 1, ultraviolet ray 2, and ultraviolet ray 1 (assuming that wavelength of ultraviolet ray 1 is different from wavelength of ultraviolet ray 2). Also, in FIG. 14, the exposure time of the respective colors is set to be substantially equal to each other. Alternatively, the exposure time of these colors may be made different from each other.

Figure 9:
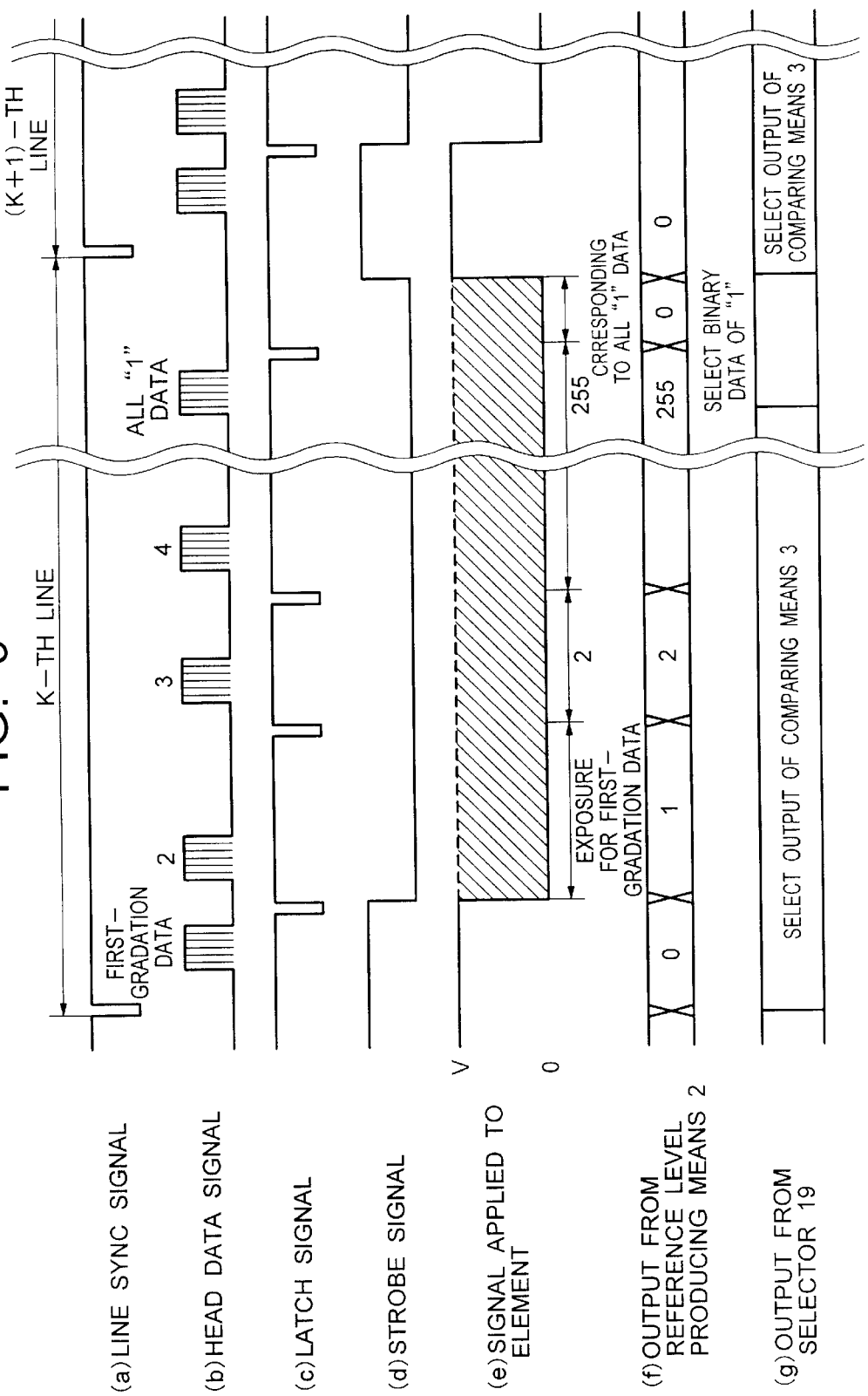
FIG. 9 is a timing chart for indicating operations of the optical printing apparatus according to the embodiment mode 2 of the present invention.
Figure 15:
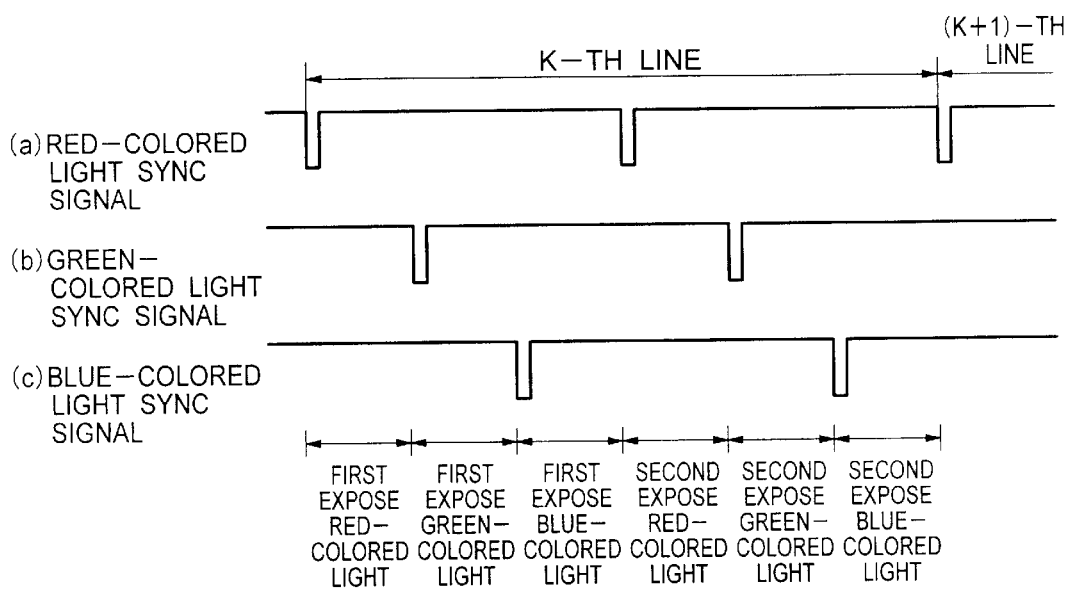
FIG. 15 is a timing chart for showing operations of the optical printing apparatus according to the embodiment mode 5 of the present invention.

Referring now to FIG. 1 and FIG. 15, printing operation of the optical printing apparatus according to this embodiment mode 5 will be explained. FIG. 15 is a timing chart for explaining a driving operation in the case that the printing operation according to this embodiment mode 5 is carried out with employment of a synchronous (sync) signal of each of the red, green, and blue colors instead of the line sync signal as shown in FIG. 5, FIG. 8, and FIG. 9.

Concretely speaking, in this optical scanning apparatus, in response to image data, as previously explained, a head data signal, a latch signal, and a strobe signal are outputted in synchronism with a falling signal of a red sync signal indicated in FIG. 15(*a*), corresponding to the output signal derived from the control means (not shown). Thus, a first red-light exposure operation is accomplished. Then, a first green-light exposure operation is similarly accomplished in synchronism with a falling signal of a green sync signal shown in FIG. 15(*b*). A first blue exposure operation is similarly accomplished in synchronism with a falling signal of a blue sync signal shown in FIG. 15(*c*). Furthermore, second color exposure operations for the respective colors are accomplished in synchronism with the red sync signal, the green sync signal, and the blue sync signal. As a result, a 1-line image forming operation is completed. Furthermore, while similar image forming operations/exposure operations are repeatedly performed, an 1-screen image forming operation is completed.

As explained above, in accordance with this embodiment mode 5, since the light sources 8 are switched plural times within 1 line, the optical printing apparatus can print out the desirable image with the high image quality and without color shifts.

Also, in this embodiment mode 5, various modifications and changes as explained in the above-described embodiment modes 1 to 4 may be achieved. For instance, in the above-described arrangement, an arrangement for solving a density variation with respect to a change in environment temperatures may be added. As this arrangement, temperature detecting means (thermistor: not shown) is provided within the optical printing apparatus, or near the print head 7 so as to detect the temperature (namely, environmental temperature and head temperature of print head 7). Thereafter, this temperature detection result is entered into the strobe control means 6, and then the strobe width may be corrected based upon the temperature. In this alternative case, it is possible to realize such a recording apparatus with a high image quality which is not adversely influenced by the temperature. Furthermore, the adverse influences caused by a difference in the characteristics caused by exposed colors, and also by humidities may be similarly corrected, and the present invention is not limited thereto.

Also, in such a case that each of these color light is subdivided and the subdivided color light is exposed, the respective color-light exposure operations may be carried out as follows. A first color-light exposure operation for data corresponding to first gradation data through 127-th gradation data is carried out; and a second color-light exposure operation for data corresponding to the remaining gradation data is carried out. Alternatively, a first color-light exposure operation for odd-numbered gradation data is carried out; and a second color-light exposure operation for even-numbered gradation data is carried out. These alternative color-light exposure operations may be realized by merely changing the method for producing the references level from the reference level producing means 2. Alternatively, a difference may be made between the first exposure time and the second exposure time. Also, the plural color-light exposure operations of this embodiment mode 5 may be combined with the driving of the non-recording pixel as executed in the embodiment mode 1. A proper change may be made.

Embodiment Mode 6

Figure 16:
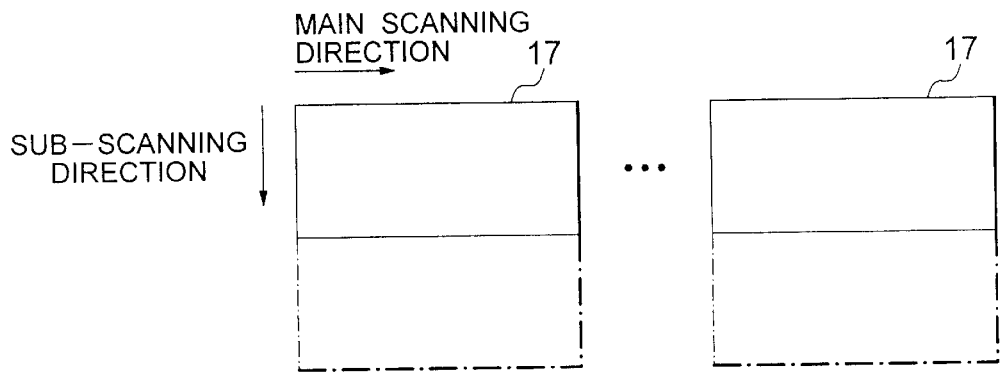
FIG. 16 is a diagram for indicating operations of an optical printing apparatus according to an embodiment mode 6 of the present invention.
Figure 17:
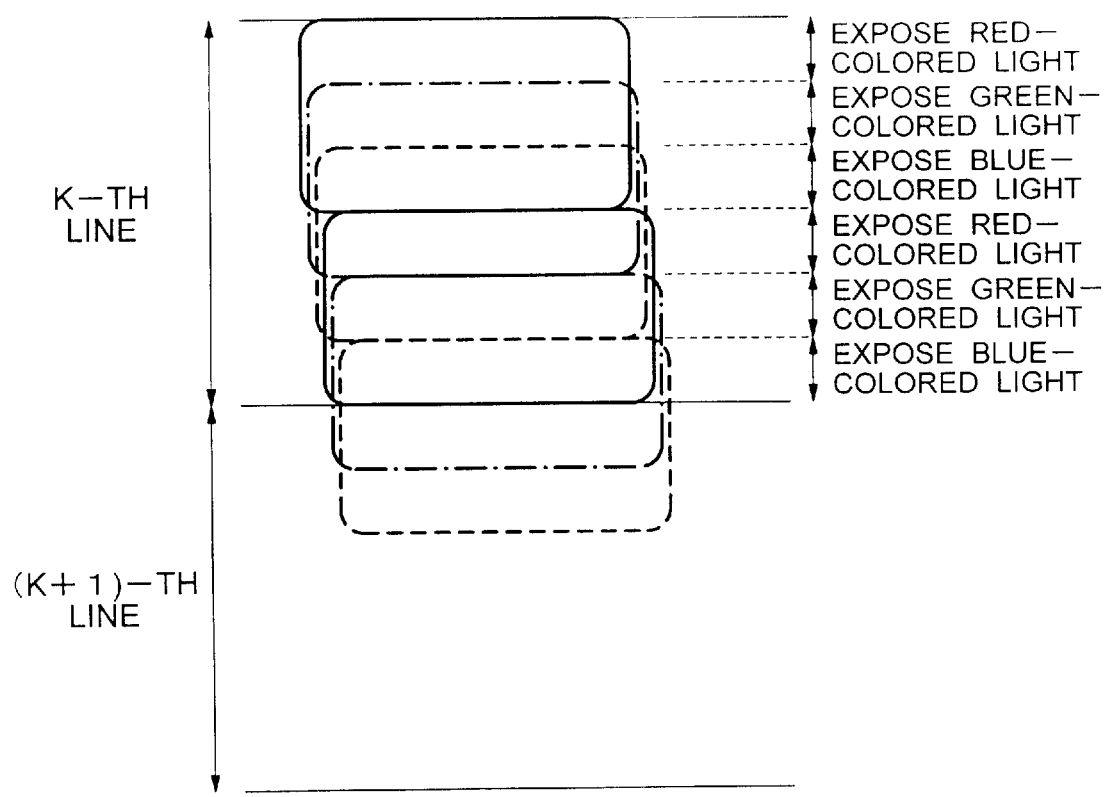
FIG. 17 is a diagram for indicating operations of the optical printing apparatus according to the embodiment mode 6 of the present invention.

An optical printing apparatus according to an embodiment mode 6 of the present invention will now be explained with reference to drawings. This embodiment mode 6 is accomplished by improving the shape of the LCD shutter element 17 of the print head 7 used in the embodiment mode 5. FIG. 16 schematically shows a shape of this improved LCD shutter element 17. FIG. 17 illustrates a condition of a recorded pixel when the above-described LCD shutter element 17 is employed.

The LCD shutter element 17 shown in FIG. 16 is arranged by that a length of this LCD shutter element 17 along the sub-scanning direction is made shorter than another length thereof along the main scanning direction. It should also be noted that a dot/dash line indicates the structure of the conventional LCD shutter element. Comparing with the drive condition of FIG. 14, the drive condition shown in FIG. 17 with employment of the above-explained LCD shutter element 17 may be understood as follows: A recording pixel in a K-th line gives substantially no influence to that in a (K+1)-th line. That is, it can be seen that this LCD shutter element 17 of FIG. 16 may own a superior resolution characteristic. It should also be noted that operations of this optical printing apparatus is similar to those of the embodiment mode 5.

As previously explained, in accordance with the optical printing apparatus of this embodiment mode 6, since the shape of the LCD shutter element 17 is optimized, the high image quality recording operation with containing the color shifts can be performed while achieving the superior resolution characteristic.

Embodiment Mode 7

An optical printing apparatus according to an embodiment mode 7 of the present invention will now be explained with reference to drawings. This embodiment mode 7 is accomplished by optimizing the sequential operation used in the embodiment mode 5, and the embodiment mode 6. A desirable image may be formed under no light leak condition.

In the optical printing apparatus of this embodiment mode 7, when light sources 8 are switched, a liquid crystal (LCD) shutter element 17 is shielded. It is now assumed that the implication "LCD shutter element 17 is shielded when the light sources are switched" may involve such a short-time transmission condition that even if the LCD shutter element 17 is brought into the transmission state, then no adverse influence is given to image forming operation by a photosensitive recording medium. There is no specific limitation in the numbers when the LCD shutter element 17 is shielded. After the LCD shutter element 17 has been shielded, the light sources 8 must be switched in this operation order.

Figure 18:
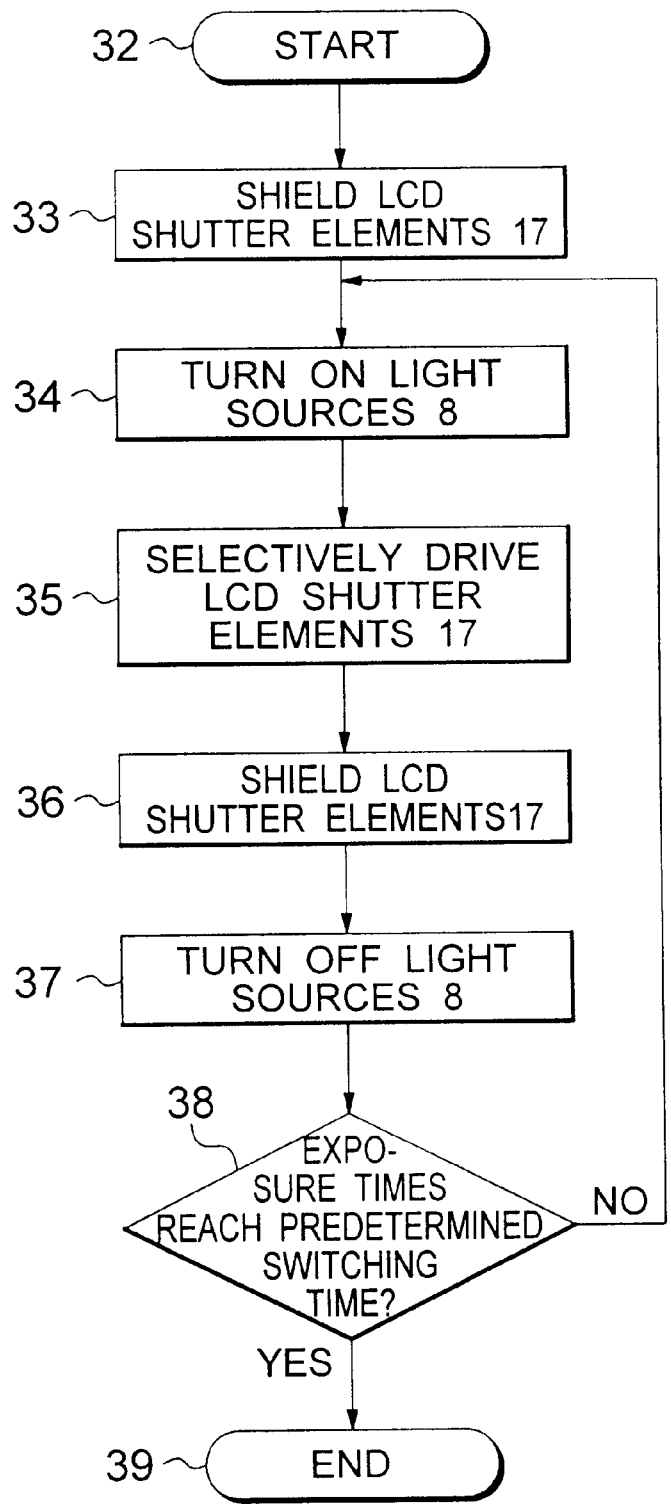
FIG. 18 is a flow chart for indicating operations of an optical printing apparatus according to an embodiment mode 7 of the present invention.
Figure 19:
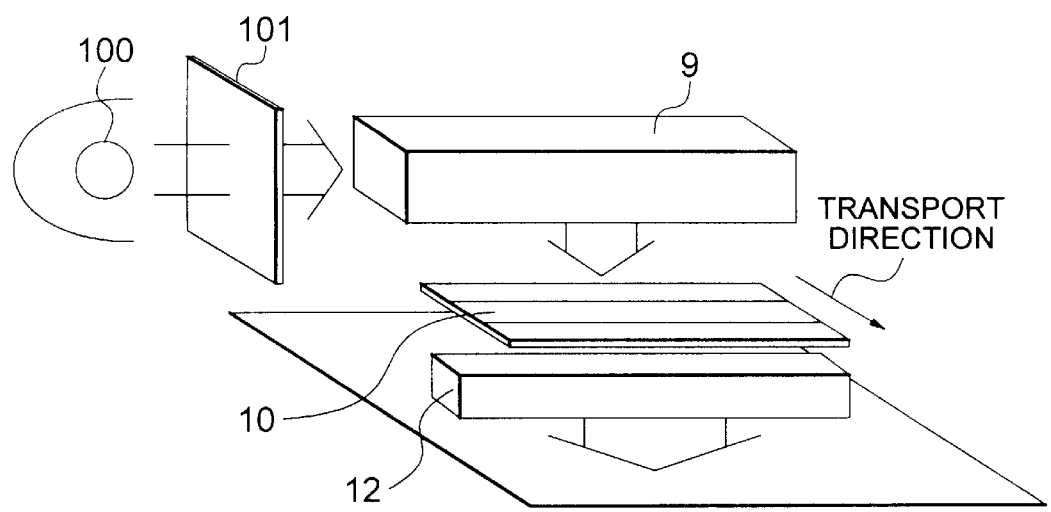
FIG. 19 is an illustration for indicating the arrangement of the conventional optical printing apparatus.

Referring now to FIG. 18, printing operation of the optical printing apparatus according to this embodiment mode 7 will be explained. FIG. 18 is a flow chart for explaining a sequential operation in the case that the printing operation according to this embodiment mode 7 is carried out with employment of the print head 7 shown in FIG. 2(a). As the print head 7, the following structure is described. That is, for instance, while 3 sets of red/green/blue-colored-light light sources 8 are provided and also the LCD shutter element 17 is arranged in a single column, the light sources 8 are switched three times within 1 line to thereby form a desirable image.

In the printing operation, first of all, this printing operation by the optical printing apparatus is commenced at a step 32. Then, the LCD shutter element 17 is brought into a shielded condition (step 33). In order that the LCD shutter element 17 is brought into such a shielded condition, a head data signal of "0" may be outputted. For example, image data may be produced by a control means, and "0" may be produced by inverting data of "1" obtained when the selector 19 of FIG. 7 is employed into data of "0".

Next, for example, the red-colored-light light source 8 is turned ON by the control means (not shown) at a step 34. Then, the LCD shutter elements 17 are selectively driven by the above-explained driving method at a step 35. At a further step 36, after the LCD shutter element 17 is shielded as at the previous step 33, the light source 8 is turned OFF at a step 37. Next, when the switching times of the light sources 8 are not reached to a predetermined switching time saved in the control means (not shown), this process operation is branched to the previous step 34 at which, for instance, the green-colored light source 8 is turned ON. Then, the above-explained sequential operation is executed. On the other hand, when the switching times of the light sources 8 are reached to a preselected switching time, this process operation is ended at a step 39.

As previously described, in accordance with this embodiment mode 7, since the LCD shutter element 17 is brought into the shielded state when the light sources 8 are switched, the optical printing apparatus can perform the high image quality recording operation without any light leakage.

It should be noted that various modifications and changes as previously described in the embodiment modes 1 to 6 may be realized also in this embodiment mode 7. For example, also, as the wavelength of the light emitted from the light source 8, not only visible light, but also infrared rays and ultraviolet rays may be similarly used. Alternatively, a light source having either a narrow wavelength range or a wide wavelength range may be employed. Also, there is no limitation in a total number of light sources 8. Furthermore, both the turn-ON of the light sources 8 and the turn-OFF thereof may be carried out at the same timing. For instance, both the turn-OFF of the red-colored-light light source 8 and the turn-ON of the green-colored-light light source 8 are performed at the same timing. In addition, a waiting operation may be set for a constant time period from turning-ON of the light source 8 until the stable condition, or may be properly changed.

What is claimed is:

1. An optical printing apparatus for selectively exposing light emitted from a print head onto a photosensitive recording medium to thereby form a gradation image, in which the print head contains a light source and a plurality of liquid crystal shutter elements, comprising:

image data input means for inputting image data and outputting multi-value data;

reference level producing means for producing a reference level;

comparing means for comparing multi-value data outputted from said image data input means with said reference level so as to convert said multi-value data into binary data;

data transferring means for transferring said binary data outputted from said comparing means as head data to the print head;

latch control means for latching data of said head data; and strobe control means capable of causing the print head to expose the light therefrom, wherein the print head is driven in response to the output results of said data transferring means, said latch control means, and said strobe control means to thereby form the gradation image, and wherein said printing apparatus is operatively arranged to ON/OFF drive the liquid crystal shutter elements corresponding to non-recording pixels, said non-recording pixels representing said inputted image data of "0".

2. An optical printing apparatus as claimed in claim 1 wherein:

the plurality of liquid crystal shutter elements are positive type liquid crystal elements.

3. An optical printing apparatus as claimed in claim 1 wherein:

the plurality of liquid crystal shutter elements are TN (twisted nematic) type liquid crystal elements.

4. An optical printing apparatus for selectively exposing light emitted from a print head onto a photosensitive recording medium to thereby form a gradation image, in which the print head contains a light source and a plurality of liquid crystal shutter elements, comprising:

image data input means for inputting image data and outputting multi-value data;

reference level producing means for producing a reference level;

comparing means for comparing multi-value data outputted from said image data input means with said reference level so as to convert said multi-value data into binary data;

a selector for selecting any one of the binary data outputted from said comparing means and binary data of "1";

data transferring means for transferring said binary data outputted from said selector as head data to the print head;

latch control means for latching data of said head data; and strobe control means capable of causing the print head to expose the light therefrom, wherein the print head is driven in response to the output results of said data transferring means, said latch control means, and said strobe control means to thereby form the gradation image, and wherein said printing apparatus is operatively arranged to ON/OFF drive the liquid crystal shutter elements for arbitrary time irrespective of the image data.

5. An optical printing apparatus for selectively exposing light emitted from a print head onto a photosensitive recording medium to thereby form a gradation image, in which the print head contains a light source and a plurality of liquid crystal shutter elements, comprising:

image data input means for inputting image data and outputting multi-value data;

reference level producing means for producing a reference level;

comparing means for comparing multi-value data outputted from said image data input means with said reference level so as to convert said multi-value data into binary data;

data transferring means for transferring said binary data outputted from said comparing means as head data to the print head;

latch control means for latching data of said head data; and strobe control means capable of causing the print head to expose the light therefrom, wherein said printing apparatus is operatively arranged to ON/OFF drive the liquid crystal shutter elements after the light source is turned ON and a preselected time period has passed; and wherein the print head is driven in response to the output results of said data transferring means, said latch control means, and said strobe control means to thereby form the gradation image.

6. An optical printing apparatus for selectively exposing light emitted from a print head onto a photosensitive recording medium to thereby form a gradation image, in which the print head contains a light source and a plurality of liquid crystal shutter elements, comprising:

image data input means for inputting image data and outputting multi-value data;

reference level producing means for producing a reference level;

comparing means for comparing multi-value data outputted from said image data input means with said reference level so as to convert said multi-value data into binary data;

data transferring means for transferring said binary data outputted from said comparing means as head data to the print head;

latch control means for latching data of said head data; and strobe control means capable of causing the print head to expose the light therefrom, wherein the print head is driven in response to the output results of said data transferring means, said latch control means, and said strobe control means to thereby form the gradation image, and wherein said printing apparatus is operatively arranged to ON/OFF drive the liquid crystal shutter elements corresponding to non-recording pixels, while the light source is not turned ON, said non-recording pixels representing said inputted image data of "0".

7. An optical printing apparatus for selectively exposing light emitted for a print head onto a photosensitive recording medium to thereby form a gradation image, in which the print head contains a plurality of light sources and a plurality of liquid crystal shutter elements, comprising:

image data input means for inputting image data and outputting multi-value data;

reference level producing means for producing a reference level;

comparing means for comparing multi-value data outputted from said image data input means with said reference level so as to convert said multi-value data into binary data;

data transferring means for transferring said binary data outputted from said comparing means as head data to the print head;

latch control means for latching data of said head data; and strobe control means capable of causing the print head to expose the light therefrom, wherein the print head is driven in response to the output results of said data transferring means, said latch control means, and said strobe control means to thereby form the gradation image, and wherein said printing apparatus is operatively arranged to switch said plurality of light sources plural times larger than a total number of the light sources within 1 line, and wherein said plurality of light sources are switched in response to nonrecording pixels, said non-recording pixels representing said inputted image data of "0".

8. An optical printing apparatus as claimed in claim 7 wherein:

a shape of the liquid crystal shutter elements is formed in such a manner that a length of the liquid crystal shutter element along a sub-scanning direction is made shorter than that along a main scanning direction.

9. An optical printing apparatus as claimed in claim 7 wherein:

when the light sources are switched, the liquid crystal shutter elements are shielded.

10. An optical printing apparatus for selectively exposing light emitted from a print head onto a photosensitive recording medium to thereby form a gradation image, in which the print head contains a light source and a plurality of liquid crystal shutter elements, said printing apparatus comprising:

an input receiving image data and outputting multi-value data;

a reference level generator producing a reference level;

a comparator operatively connected to said input and said reference level generator, said comparator comparing multi-value data outputted from said input with said produced reference level, said comparator converting said multi-value data into binary data based on said comparison;

a data transferring element transferring said binary data outputted from said comparator as head data to the print head;

a latch controller latching data of said head data; and a strobe controller operatively arranged to cause the print head to expose the light therefrom, wherein the print head is driven in response to the output results of said data transferring means, said latch control means, and said strobe control means to thereby form the gradation image, and wherein said printing apparatus is operatively arranged to ON/OFF drive the liquid crystal shutter elements corresponding to non-recording pixels, said non-recording pixels representing said inputted image data of "0".

11. An optical printing apparatus as in claim 10 wherein:
the plurality of liquid crystal shutter elements are positive type liquid crystal elements.

12. An optical printing apparatus as claimed in claim 10 wherein:
the plurality of liquid crystal shutter elements are TN (twisted nematic) type liquid crystal elements.

13. An optical printing apparatus for selectively exposing light emitted from a print head onto a photosensitive recording medium to thereby form a gradation image, in which the print head contains a light source and a plurality of liquid crystal shutter elements, said printing apparatus comprising:
an input receiving image data and outputting multi-value data;
a reference level generator producing a reference level;
a comparator operatively connected to said input and said reference level generator, said comparator comparing multi-value data outputted from said input with said produced reference level, said comparator converting said multi-value data into binary data;
a selector operatively connected to said comparator and arranged to choose between said binary data output by said comparator and binary data of "1";
a data transferring element operatively connected to said selector, said transferring element transferring said binary data chosen by said selector as head data to the print head;
a latch controller latching data of said head data; and
a strobe controller operatively arranged to cause the print head to expose the light therefrom;
wherein said printing apparatus is operatively arranged to ON/OFF drive the liquid crystal shutter elements for arbitrary time irrespective of the image data.

14. An optical printing apparatus for selectively exposing light emitted from a print head onto a photosensitive recording medium to thereby form a gradation image, in which the print head contains a light source and a plurality of liquid crystal shutter elements, said printing apparatus comprising:
an input receiving image data and outputting multi-value data;
a reference level generator producing a reference level;
a comparator operatively connected to said input and said reference level generator, said comparator operatively arranged to compare multi-value data outputted from said input with said prodiced reference level, said comparator converting based on said comparing said multi-value data into binary data;
a data transferring means for transferring said binary data outputted from said comparing means as head data to the print head;
a latch control means for latching data of said head data; and
a strobe control means arranged to cause the print head to expose the light therefrom;
wherein said printing apparatus is operatively arranged to ON/OFF drive the liquid crystal shutter elements after the light source is turned ON and a preselected time period has passed.

15. An optical printing apparatus for selectively exposing light emitted from a print head onto a photosensitive recording medium to thereby form a gradation image, in which the print head contains a light source and a plurality of liquid crystal shutter elements, said printing apparatus comprising:
an input receiving image data and outputting multi-value data;
a reference level generator producing a reference level;
a comparator operatively connected to said input and said reference level generator, said comparator arranged to compare multi-value data outputted from said input with said produced reference level, said comparator arranged to convert said multi-value data into binary data based on said comparison;
a data transferring element transferring said binary data outputted from said comparator as head data to the print head;
a latch controller latching data of said head data; and
a strobe controller operatively arranged to cause the print head to expose the light therefrom,
wherein the print head is driven in response to the output results of said data transferring means, said latch control means, and said strobe control means to thereby form the gradation image, and
wherein said printing apparatus is operatively arranged to ON/OFF drive the liquid crystal shutter elements corresponding to non-recording pixels, while the light source is not turned ON, said non-recording pixels representing said inputted image data of "0".

16. An optical printing apparatus for selectively exposing light emitted for a print head onto a photosensitive recording medium to thereby form a gradation image, in which the print head contains a plurality of light sources and a plurality of liquid crystal shutter elements, comprising:
an input receiving image data and outputting multi-value data;
reference level generator producing a reference level;
a comparator operatively connected to said input and said reference level generator, said comparator operatively arranged to compare said multi-value data outputted from said input with said produced reference level and convert said multi-value data into binary data based on said comparison;
a data transferring element transferring said binary data outputted from said comparator as head data to the print head;
a latch controller latching data of said head data; and
a strobe controller operatively arranged to cause the print head to expose the light therefrom,
wherein the print head is driven in response to the output results of said data transferring means, said latch control means, and said strobe control means to thereby form the gradation image, and
wherein said printing apparatus is operatively arranged to switch said plurality of light sources plural times larger than a total number of the light sources within 1 line, and wherein said plurality of light sources are switched in response to nonrecording pixels, said non-recording pixels representing said inputted image data of "0".

17. An optical printing apparatus as in claim 16 wherein:
a shape of said liquid crystal shutter element is formed in such a manner that a length of said liquid crystal shutter element along a sub-scanning direction is made shorter than that along a main scanning direction.

18. An optical printing apparatus as in claim 16 wherein:
when the light sources are switched, the liquid crystal shutter elements are shielded.

* * * * *